(12) United States Patent
Mizuno et al.

(10) Patent No.: US 8,444,739 B2
(45) Date of Patent: May 21, 2013

(54) HONEYCOMB FILTER

(75) Inventors: Yukio Mizuno, Komaki (JP); Naomi Noda, Ichinomiya (JP); Toshio Yamada, Nagoya (JP); Yukio Miyairi, Nagoya (JP); Yukari Nakane, Nagoya (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 460 days.

(21) Appl. No.: 12/603,338

(22) Filed: Oct. 21, 2009

(65) Prior Publication Data

US 2010/0135866 A1 Jun. 3, 2010

Related U.S. Application Data

(63) Continuation of application No. PCT/JP2008/056385, filed on Mar. 31, 2008.

(30) Foreign Application Priority Data

Apr. 27, 2007 (JP) ................................. 2007-119198
Feb. 22, 2008 (JP) ................................. 2008-041126

(51) Int. Cl.
*B01D 50/00* (2006.01)
*B01D 39/00* (2006.01)
*B01D 39/06* (2006.01)
*B01D 24/00* (2006.01)
*B01D 39/14* (2006.01)
*F01N 3/00* (2006.01)

(52) U.S. Cl.
USPC ............... 55/523; 55/522; 55/524; 422/169; 422/170; 422/171; 422/172; 422/177; 422/178; 422/179; 422/180; 422/181; 422/182; 60/297

(58) Field of Classification Search
USPC ... 55/522–524; 422/169–172, 177–182; 60/297
See application file for complete search history.

(56) References Cited

U.S. PATENT DOCUMENTS

| | | | | |
|---|---|---|---|---|
| 4,857,089 A | * | 8/1989 | Kitagawa et al. | ............... 55/523 |
| 5,073,178 A | | 12/1991 | Mimori et al. | |

(Continued)

FOREIGN PATENT DOCUMENTS

| EP | 0 736 503 A1 | 10/1996 |
|---|---|---|
| EP | 1 437 491 A1 | 7/2004 |

(Continued)

OTHER PUBLICATIONS

U.S. Appl. No. 12/974,259.

(Continued)

*Primary Examiner* — Amber Orlando
(74) *Attorney, Agent, or Firm* — Oliff & Berridge, PLC

(57) ABSTRACT

A honeycomb filter including partition walls having a porous partition wall base material and a surface layer provided on only inflow side or both inflow and outflow sides of the partition wall base material, and satisfying the following conditions capable of using as a DPF. The surface layer has a peak pore diameter of from 0.3 μm to 20 μm (exclusive) being equal to or smaller than the average pore diameter of the base material; the porosity of from 60% to 95% (exclusive) when measured by mercury porosimetry being larger than that of the base material; and the thickness L1 of from 0.5% to 30% (exclusive) of the partition wall thickness L2; and mass per filtration area of from 0.01 mg/cm$^2$ to 6 mg/cm$^2$ (exclusive). The base material has an average pore diameter of from 10 μm to 60 μm (exclusive) and a porosity of from 40% to 65% (exclusive).

10 Claims, 3 Drawing Sheets

U.S. PATENT DOCUMENTS

| | | | |
|---|---|---|---|
| 5,198,006 | A | 3/1993 | Mimori et al. |
| 5,198,007 | A * | 3/1993 | Moyer et al. .................... 55/523 |
| 5,221,484 | A | 6/1993 | Goldsmith et al. |
| 6,936,561 | B2 * | 8/2005 | Marques et al. ................ 502/64 |
| 7,567,817 | B2 * | 7/2009 | Liu et al. ...................... 455/523 |
| 7,621,981 | B2 * | 11/2009 | Blackwell et al. ............. 95/273 |
| 7,722,827 | B2 * | 5/2010 | Fischer et al. ................ 422/168 |
| 7,972,400 | B2 * | 7/2011 | Mizuno et al. ................. 55/482 |
| 2002/0053202 | A1 * | 5/2002 | Akama et al. .................. 60/297 |
| 2002/0178707 | A1 * | 12/2002 | Vance et al. ................... 55/523 |
| 2004/0033175 | A1 * | 2/2004 | Ohno et al. ................... 422/180 |
| 2004/0175315 | A1 * | 9/2004 | Brisley et al. ............. 423/239.1 |
| 2004/0191133 | A1 * | 9/2004 | Yamaguchi ................... 422/180 |
| 2005/0011186 | A1 * | 1/2005 | Saito et al. ..................... 60/297 |
| 2005/0074374 | A1 * | 4/2005 | Ogura .......................... 422/180 |
| 2005/0129588 | A1 * | 6/2005 | Nunan .......................... 422/177 |
| 2005/0266991 | A1 * | 12/2005 | Ohno et al. ................... 502/439 |
| 2006/0057046 | A1 * | 3/2006 | Punke et al. ............... 423/215.5 |
| 2006/0120937 | A1 * | 6/2006 | Zuberi ....................... 423/215.5 |
| 2007/0224092 | A1 * | 9/2007 | Miyairi et al. ............... 422/180 |
| 2007/0234694 | A1 * | 10/2007 | Miyairi et al. ................. 55/523 |
| 2008/0178992 | A1 * | 7/2008 | Pillai et al. .................... 156/197 |
| 2011/0212831 | A1 | 9/2011 | Goto et al. |

FOREIGN PATENT DOCUMENTS

| | | |
|---|---|---|
| JP | U-60-100016 | 7/1985 |
| JP | A-63-240912 | 10/1988 |
| JP | A-03-047507 | 2/1991 |
| JP | A-05-146617 | 6/1993 |
| JP | A-06-033734 | 2/1994 |
| JP | A-08-332329 | 12/1996 |
| JP | B2-2675071 | 11/1997 |
| JP | A-2003-210922 | 7/2003 |
| JP | A-2004-216266 | 8/2004 |
| WO | WO 92/11921 A1 | 7/1992 |

OTHER PUBLICATIONS

U.S. Appl. No. 13/469,252.

* cited by examiner

HONEYCOMB FILTER

This is a Continuation of International Application No. PCT/JP2008/056385 filed Mar. 31, 2008, which claims the benefit of Japanese Patent Application Nos. 2007-119198 and 2008-041126 filed Apr. 27, 2007 and Feb. 22, 2008, respectively. The disclosure of the prior applications is hereby incorporated by reference herein in its entirety.

TECHNICAL FIELD

The present invention relates to a honeycomb filter which traps particulate matter in an exhaust gas.

BACKGROUND ART

There is an increasing need to remove, from exhaust gas, particulate matter included in the exhaust gas discharged from an internal combustion engine such as an engine for an automobile, an engine for a construction machine or a stational engine for an industrial machine, other combustion devices and the like in consideration of an influence on an environment. In particular, a regulation concerning the removal of the particulate matter (also referred to as the PM) discharged from a diesel engine tends to be strengthened worldwide. From such a situation, a diesel particulate filter (DPF) for trapping and removing the PM attracts attention.

Examples of the DPF include a honeycomb filter provided with porous partition walls which separate and form a plurality of cells functioning as fluid flow paths. Predetermined cells each having one end opening on one side and the other end plugged on the other side and the remaining cells each having one end plugged on one side and the other end opened on the other side are alternately arranged. Fluid (the exhaust gas) which has flowed into one open end of the honeycomb filter where the predetermined cells open passes through the partition walls and is discharged as the transmitted fluid toward the remaining cells. Furthermore, the exhaust gas is discharged from the other end of the honeycomb filter where the remaining cells open, and the PM is trapped and removed from the exhaust gas. In a filter (a wall flow type filter) such as this honeycomb filter having a structure in which the exhaust gas passes through the porous partition walls, a large filtration area is obtained, so that a filtration flow rate (the partition wall passing flow rate) can be lowered, and pressure loss is decreased. Furthermore, the filter has a comparatively satisfactory particulate matter trapping efficiency.

It is to be noted that examples of prior documents having the same problem as that described later of the present invention include Patent Documents 1 to 3. In Patent Documents 1, 2, a technology for providing fiber layers as the surface layers of the partition walls is disclosed, and the shape of a material for preparing the surface layer is defined. Moreover, in Patent Document 3, a technology of filling pores in the partition walls with fibers or whiskers is disclosed.

Patent Document 1: JP-A-2004-216226
Patent Document 2: JP-A-6-33734
Patent Document 3: Japanese Patent No. 2675071

DISCLOSURE OF THE INVENTION

However, a DPF to which such a honeycomb filter has been applied has the following problems to be solved.

(a) When the DPF starts trapping PM from a clean state, the filter first comes in a deep layer filtering state in which the PM enters porous partition wall pores and is trapped in the partition walls, and a surface filtering state in which the PM is trapped on the surfaces of the partition walls. Finally, after the PM is deposited on the surfaces of the partition walls, the PM forms a layer, and the state shifts to a cake filtering state in which the layer itself performs a filter function. When such a filter function proceeds, the PM is deposited in the inner portions (the pores) of the partition walls in an initial deep layer filtering process. Therefore, immediately after the start of the PM trapping, the substantial porosity of the partition walls decreases, the flow rate of an exhaust gas passing through the partition walls increases, and pressure loss sometimes rapidly increases. Such a rapid increase of the pressure loss immediately after the PM trapping starts unfavorably lowers engine performance.

(b) In the DPF, the PM needs to be combusted and removed to regenerate the filter at a time when the predetermined amount of the PM is trapped and deposited. In this case, the amount of the deposited PM is usually estimated from the pressure loss. However, in the DPF having a conventional partition wall pore structure, the only PM deposited in the pores is naturally combusted, so that the pressure loss has hysteresis with respect to the total amount of the deposited PM, and the amount of the PM cannot precisely be estimated based on the pressure loss.

(c) As the pore diameters of the partition walls are small and the thicknesses of the partition walls are large, the DPF can efficiently trap the PM. Moreover, to prevent the entering of the PM in the inner portions (the pores) of the partition walls and shift to the cake filtering state early, the pore diameters of the partition walls are preferably set to small diameters. However, when the pore diameters of the partition walls are decreased and the partition walls are thickened, the increase of the pressure loss of the partition walls themselves before the PM deposition is caused, and this unfavorably lowers the engine performance.

(d) In the DPF, a double layer structure in which a surface layer is formed on a porous partition wall base material is sometimes employed, but heretofore the surface layer has peeled to lower filtering precision.

To solve these problems, investigations have been performed to develop the present invention, and an object of the present invention is to provide a DPF which has a satisfactory PM trapping efficiency and only has a small pressure loss during PM deposition but does not have any rapid pressure loss increase immediately after PM trapping starts (in the initial stage of the PM deposition) (the solution of the problem (a)); which does not have any hysteresis characteristics in a relation between the amount of the deposited PM and the pressure loss (the solution of the problem (b)); which minimizes the pressure loss in an initial state where any PM is not deposited (the solution of the problem (c)); and in which the surface layer does not easily peel (the solution of the problem (d)).

That is, according to the present invention, there is provided a honeycomb filter (also referred to as the first honeycomb filter) provided with: partition walls having a porous partition wall base material which separates and forms a plurality of cells functioning as the flow paths of fluid and a surface layer provided on only the inflow side or both the inflow side and an outflow side of the partition wall base material, wherein predetermined cells each having one end opened on one side and the other end plugged on the other side and the remaining cells each having one end plugged on one side and the other end opened on the other side are alternately arranged, and the following conditions (1) to (5) are satisfied, (1) the peak pore diameter of the surface layer is equal to or smaller than the average pore diameter of the partition wall base material, and the porosity of the surface layer is larger than that of the partition wall base material, (2) the surface layer has a peak pore diameter of 0.3 µm or more and less than 20 µm and a porosity of 60% or more and less than 95% (the measurement method is mercury porosimetry), (3) the thickness L1 of the surface layer is 0.5% or more and less than 30% of the thickness L2 of the partition walls, (4) the mass of the surface layer per filtration area is 0.01 mg/cm² or more and less than 6 mg/cm², and (5) the partition wall base material has an average pore diameter of 10 µm or more and less than 60 µm and a porosity of 40% or more and less than 65%.

In the first honeycomb filter of the present invention, in a distribution in a direction in which the one end is connected to the other end, the thickness L1 of the surface layer in the center thereof is preferably smaller than that in the vicinity of the one end or the other end. In this configuration, the thickness L1 of the surface layer means an average value. Even in this case, needless to say, the condition (3) is to be satisfied.

In the first honeycomb filter of the present invention, the surface layer preferably has a peak pore diameter of 3 µm or more and less than 10 µm, and a porosity of 80% or more and less than 95%.

In the first honeycomb filter of the present invention, the thickness L1 of the surface layer is preferably 3% or more and less than 15% of the thickness L2 of the partition walls.

In the first honeycomb filter of the present invention, the partition wall base material preferably has an average pore diameter of 40 µm or more and less than 60 µm, and a porosity of 40% or more and less than 60%.

In the first honeycomb filter of the present invention, the partition wall base material is preferably constituted of, as the main component, at least one material selected from the material group consisting of cordierite, Si coupled SiC, recrystallized SiC, aluminum titanate, mullite, silicon nitride, sialon, zirconium phosphate, zirconia, titania, alumina and silica.

The first honeycomb filter of the present invention is provided with plugging portions which plug the cells. As the material of the plugging portions, at least one material selected from the group consisting of the above partition wall base materials may be used.

In the first honeycomb filter of the present invention, the surface layer preferably contains 70 mass % or more of ceramic or metal fibers. In this case, the fibers are preferably constituted of, as the main component, at least one material selected from the material group consisting of aluminosilicate, alumina, silica, zirconia, ceria and mullite. Moreover, the fibers preferably have an average diameter of 0.5 µm or more and less than 8 µm, and an average length of 100 µm or more and less than 500 µm. Furthermore, the fibers are preferably bio-soluble fibers.

In the first honeycomb filter of the present invention, the surface layer preferably carries a catalyst containing one or both of platinum and palladium. In this case, an oxide having oxygen according property, for example, ceria, zirconia or the like is more preferably carried as an auxiliary catalyst.

Next, according to the present invention, there is provided a honeycomb filter (also referred to as the second honeycomb filter) provided with: partition walls having a porous partition wall base material which separates and forms a plurality of cells functioning as the flow paths of fluid and a surface layer provided on only the inflow side or both the inflow side and an outflow side of the partition wall base material, wherein predetermined cells each having one end opened on one side and the other end plugged on the other end and remaining cells each having one end plugged on one end and the other end opened on the other side are alternately arranged, the surface layer provided on at least the inflow side of the partition wall base material is constituted of a catalyst layer containing at least one material selected from the material group consisting of alumina, zirconia, titania, zeolite and ceria, and the following conditions (I) to (V) are satisfied, (I) the peak pore diameter of the surface layer is equal to or smaller than the average pore diameter of the partition wall base material, and the porosity of the surface layer is larger than that of the partition wall base material, (II) the surface layer has a peak pore diameter of 0.3 µm or more and less than 20 µm and a porosity of 60% or more and less than 95% (the measurement method is mercury porosimetry), (III) the thickness L1 of the surface layer is 0.5% or more and less than 30% of the thickness L2 of the partition walls, (IV) the mass of the surface layer per filtration area is 0.01 mg/cm² or more and less than 6 mg/cm², and (V) the partition wall base material has an average pore diameter of 10 µm or more and less than 60 µm and a porosity of 40% or more and less than 65%.

In the second honeycomb filter of the present invention, the hydraulic diameters of the cells in the end face on the inlet side of the fluid are preferably equal to or larger than those of the cells in the end face on the outlet side of the fluid.

The hydraulic diameter is calculated by 4×(sectional area)/(peripheral length) based on the sectional area and the peripheral length of each cell (the space).

In the second honeycomb filter of the present invention, the partition walls preferably have a permeability of $0.5 \times 10^{-12}$ m² or more.

The permeability means a physical value calculated by the following equation (1). This is a value as an index indicating a passage resistance in a case where predetermined gas passes through a member (the partition wall). In the equation (1), R denotes the permeability (m²), F denotes a gas flow rate (cm³/s), T denotes a sample thickness (cm), V denotes a gas viscosity (dynes·sec/cm²), D denotes a sample diameter (cm), and P denotes a gas pressure (PSI). Moreover, as to numeric values in the equation (1), 13.839 (PSI)=1 (atm), and 68947.6 (dynes·sec/cm²)=1 (PSI).

[Equation 1]

$$R = \frac{8FTV}{\pi D^2 (P^2 - 13.839^2)/13.839 \times 68947.6} \times 10^{-4} \quad (1)$$

In the second honeycomb filter of the present invention, the surface layer constituted of the catalyst layer preferably carries the fine particles of one or both of platinum and palladium.

Next, according to the present invention, there is provided a manufacturing method of a honeycomb filter (also referred to as the first honeycomb filter manufacturing method) including the steps of: beforehand manufacturing, as a fired article, a honeycomb structure provided with a porous partition wall base material which separates and forms a plurality of cells functioning as the flow paths of fluid; mixing at least one fibrous material selected from the material group consisting of fibrous aluminosilicate, silica, alumina, cordierite, mullite and glass, a bonding material containing as a main component silica or alumina which hardens when dried, an organic binder, and water or alcohol to obtain slurry; and depositing the slurry on only the inflow side or both the inflow side and an outflow side of the partition wall base material, and then performing drying or the drying and firing to provide a surface layer on only the inflow side or both the inflow side and the outflow side of the partition wall base material.

In the first honeycomb filter manufacturing method, when the slurry is deposited on only the inflow side or both the inflow side and the outflow side of the partition wall base material, the slurry is atomized by an atomizer to suck the slurry together with air from the ends of the cells of the honeycomb structure.

Next, according to the present invention, there is provided a manufacturing method of a honeycomb filter (also referred to as the second honeycomb filter manufacturing method) including the steps of: beforehand manufacturing, as a fired article, a honeycomb structure provided with a porous partition wall base material which separates and forms a plurality of cells functioning as the flow paths of fluid; mixing at least one fibrous material selected from the material group consisting of fibrous aluminosilicate, silica, alumina, cordierite, mullite and glass, and water or alcohol to obtain slurry, and further adding and mixing grease and a surfactant to obtain an emulsified material; and depositing the emulsified material on only the inflow side or both the inflow side and an outflow side of the partition wall base material, and then performing drying or drying and firing to provide a surface layer on only the inflow side or both the inflow side and the outflow side of the partition wall base material.

Next, according to the present invention, there is provided a manufacturing method of a honeycomb filter (also referred to as a third honeycomb filter manufacturing method) including the steps of: beforehand manufacturing, as a fired article, a honeycomb structure provided with a porous partition wall base material which separates and forms a plurality of cells functioning as the flow paths of fluid; depositing colloidal particles constituted of a polymer organic substance removed when fired on only an inflow side, or both the inflow side and an outflow side of the partition wall base material to form a colloidal particle layer, and mixing at least one fibrous material selected from the material group consisting of fibrous silica, alumina, cordierite, mullite and glass and water to obtain slurry; and impregnating the colloidal particle layer with the slurry, and then performing drying and firing to provide a surface layer on only the inflow side or both the inflow side and the outflow side of the partition wall base material.

Next, according to the present invention, there is provided a manufacturing method of a honeycomb filter (also referred to as a fourth honeycomb filter manufacturing method) comprising the steps of: beforehand obtaining a formed honeycomb article which separates and forms a plurality of cells functioning as the flow paths of fluid by forming means; mixing the same material as that of the formed honeycomb article, a pore former burnable and flyable at a temperature of 1000° C. or less, having an average pore diameter of less than 10 μm and having a ratio of 60 mass % or more and less than 90 mass % in a material solid content and water to obtain slurry; and depositing the slurry on only an inflow side or both the inflow side and an outflow side of the formed honeycomb article, and then performing drying, or drying and firing to provide a surface layer on only the inflow side or both the inflow side and the outflow side of the formed honeycomb article.

In the manufacturing method of the honeycomb filter of the present invention, the slurry constituting the surface layer after dried or after dried and fired is sometimes referred to as the slurry for the surface layer. In particular, examples of the pore former which is to be contained in the slurry for the surface layer and which matches the above requirements in the fourth honeycomb filter manufacturing method include an inorganic substance such as coke, a polymer compound such as resin balloon, or an organic substance such as starch alone or as a combination of them. The materials may be used as the pore former for use in a case where the formed honeycomb article (the partition wall base material) is prepared in the manufacturing method of the honeycomb filter of the present invention.

In the fourth honeycomb filter manufacturing method of the present invention, the pore former preferably has an average particle diameter of less than 5 μm. Furthermore, in the fourth honeycomb filter manufacturing method of the present invention, the pore former preferably has an average particle diameter of less than 3 μm.

In the fourth honeycomb filter manufacturing method of the present invention, the ratio of the pore former to a material solid content is preferably in a range of 70 mass % or more and less than 80 mass %.

The fourth honeycomb filter manufacturing method of the present invention preferably further comprises: after depositing the slurry on only the inflow side or both the inflow side and the outflow side of the formed honeycomb article and before performing drying or drying and firing, the step of plugging the cells of the formed honeycomb article in a checkered (zigzag) pattern so that predetermined cells each having one end opened on one side and the other end plugged on the other side and remaining cells each having one end plugged on one side and the other end opened on the other side are alternately arranged.

Next, according to the present invention, there is provided a manufacturing method of a honeycomb filter (also referred to as the fifth honeycomb filter manufacturing method) comprising the steps of: beforehand manufacturing, as a fired article, a honeycomb structure provided with a porous partition wall base material which separates and forms a plurality of cells functioning the flow paths of fluid; mixing at least one material selected from the material group consisting of alumina, zirconia, titania, zeolite and ceria, a pore former burnable and flyable at a temperature of 800° C. or less, having an average particle diameter of less than 10 μm and having a ratio of 20 mass % or more and less than 90 mass % in a material solid content and water to obtain slurry; and depositing the slurry on only an inflow side or both the inflow side and an outflow side of a formed honeycomb article, and then performing drying or drying and firing to provide a surface layer on only the inflow side or both the inflow side and the outflow side of the formed honeycomb article.

The first, second, third, fourth and fifth honeycomb filter manufacturing methods according to the present invention (all the methods are simply referred to as a honeycomb filter manufacturing method of the present invention) are preferably used as means for preparing the first or second honeycomb filter of the present invention (both the filters are simply referred to as a honeycomb filter of the present invention). In the fourth honeycomb filter manufacturing method of the present invention, a preferable means for plugging the cells has been clarified, but even in the first, second, third and fifth honeycomb filter manufacturing methods of the present invention, the same plugging means may be employed. In the manufacturing method of a honeycomb filter of the present invention, to plug the cells, a known method may be employed.

In the present description, the depositing (of the slurry or the like, includes coating. Specifically, in the manufacturing method of the honeycomb filter of the present invention, the depositing of the slurry or the like is realized by an atomization process, an impregnation process or the like. Moreover, in the present specification, the inflow side of the partition wall base material is the side from which the fluid is fed in a case where the fluid passes through the partition wall base material. The outflow side of the partition wall base material is the side from which the fluid is discharged in the case where the fluid passes through the partition wall base material. To deposit the slurry on only the inflow side or both the inflow side and the outflow side of the partition wall base material (or the formed honeycomb article) is to deposit the slurry on one surface or both surfaces of the partition wall base material (or the formed honeycomb article). The partition wall base material corresponds to a portion of the honeycomb filter constituted by firing the formed honeycomb article excluding the surface layer, so that the inflow side of the formed honeycomb article or the outflow side of the formed honeycomb article is sometimes referred in a preparation stage (the description of the manufacturing method). In the stage of the formed honeycomb article, the fluid cannot pass through this article. However, for example, when the inflow side or the outflow side of the formed honeycomb article is referred, it means the side corresponding to the inflow side or the outflow side of the partition wall base material of the resultant partition wall base material of the honeycomb filter, that is, one side of a substantial part (the wall) of the formed honeycomb article is referred. Moreover, for example, when the inflow side and the outflow side of the formed honeycomb article (the inflow side and the outflow side) are referred, they are the sides corresponding to the inflow side and the outflow side of the partition wall base material of the resultant partition wall base material of the honeycomb filter, that is, both sides of the substantial part (the wall) of the formed honeycomb article are referred.

When this honeycomb filter of the present invention is applied as a DPF, the following effects are produced.

The first honeycomb filter of the present invention is provided with: the partition walls having the porous partition wall base material and the surface layer provided on only the inflow side or both the inflow side and the outflow side of the partition wall base material, where (1) the peak pore diameter of the surface layer is equal to or smaller than the average pore diameter of the partition wall base material, and the porosity of the surface layer is larger than that of the partition wall base material, (2) the surface layer has a peak pore diameter of 0.3 μm or more and less than 20 μm and a porosity of 60% or more and less than 95% (the measurement method is the mercury porosimetry), (3) the thickness L1 of the surface layer is 0.5% or more and less than 30% of the thickness L2 of the partition walls, (4) the mass of the surface layer per filtration area is 0.01 mg/cm$^2$ or more and less than 6 mg/cm$^2$, and (5) the partition wall base material has an average pore diameter of 10 μm or more and less than 60 μm and a porosity of 40% or more and less than 65%. Therefore, a satisfactory PM trapping efficiency is maintained. Moreover, there is not any rapid pressure loss increase immediately after PM trapping starts (in the initial stage of the PM deposition) (the above problem (a) can be solved). A relation between the amount of the deposited PM and the pressure loss does not have any hysteresis characteristics (the above problem (b) can be solved). In addition to the pressure loss during the PM deposition, the pressure loss in an initial state in which any PM is not deposited (the honeycomb filter itself) can be minimized (the above problem (c) can be solved).

The honeycomb filter of the present invention is a wall flow type filter in which predetermined cells having an end opened on one side and the other end plugged on the other side and the remaining cells each having one end plugged on one side and the other end opened on the other side are alternately arranged. For example, fluid (the exhaust gas) which has flowed into one end of the filter where the predetermined cells open passes through the partition walls from a side provided with the surface layer and flows out as the transmitted fluid toward the remaining cells. Furthermore, the exhaust gas is discharged from the other end of the filter where the remaining cells open, and the PM in the exhaust gas is trapped and removed from the exhaust gas. In such a wall flow type filter, the distribution of the partition wall-passing flow rate of the fluid is determined by a balance between the pressure loss generated at a time when the fluid passes through the cells and the pressure loss generated at a time when the fluid passes through the partition walls. This partition wall-passing flow rate close to a fluid inlet end face (in the vicinity of the one end) and close to an outlet end face (in the vicinity of the other end) is higher than that of the center. Therefore, immediately after the PM trapping starts, the fluid flows in a concentrated manner in the vicinities of the one end and the other end, the PM is deposited in the concentrated manner in these portions, and consequently the pressure loss is increased. In the preferable embodiment of the first honeycomb filter of the present invention, in a distribution in a direction in which the one end is connected to the other end, the thickness L1 of the surface layer in the center thereof is preferably smaller than that in the vicinity of the one end or the other end. A passage resistance in the vicinities of the one end and the other end is larger than that of the center, so that the concentration of the fluid can be prevented. In consequence, the increase of the pressure loss is suppressed.

In the preferable embodiment of the first honeycomb filter of the present invention, since the surface layer has a peak pore diameter of 3 μm or more and less than 10 and a porosity of 80% or more and less than 95%, from the viewpoints of the maintaining of a satisfactory PM trapping efficiency, the prevention of the rapid pressure loss increase immediately after the PM trapping starts, the decrease of the pressure loss during the PM deposition, and the durability of the surface layer, the filter is excellent as compared with another case. If the peak pore diameter is less than 3 the initial pressure loss at a time when any PM is not deposited might excessively increase. If the diameter exceeds 10 the trapping efficiency might deteriorate. If the porosity is 80% or more, the effect of the decrease of the pressure loss during the PM deposition increases. On the other hand, if the porosity is 95% or more, it is difficult to manufacture a durable surface layer.

In the preferable configuration of the first honeycomb filter according to the present invention, since the thickness L1 of the surface layer is 3% or more and less than 15% of the thickness L2 of the partition walls, the filter is particularly excellent in that the pressure losses during the PM deposition and in the initial state, in which any PM is not deposited, can be minimized. If the thickness L1 of the surface layer is less than 3% of the thickness L2 of the partition walls, the effect of the decrease of the pressure loss during the PM deposition decreases. If this ratio exceeds 15%, the initial pressure loss might excessively increases.

In the preferable embodiment of the first honeycomb filter of the present invention, since the partition wall base material is constituted of the main component of at least one material selected from the material group consisting of cordierite, Si coupled SiC, recrystallized SiC, aluminum titanate, mullite, silicon nitride and sialon, the filter has excellent thermal stability on conditions that the filter is used at high temperature.

In the preferable embodiment of the first honeycomb filter of the present invention, since the partition wall base material and the surface layer are constituted of the same material as the main component, there is not any thermal expansion difference between the partition wall base material and the surface layer, and the surface layer does not easily peel (the above problem (d) is solved).

In the preferable embodiment of the first honeycomb filter of the present invention, since the surface layer contains 70 mass % or more of ceramic or metal fibers, communication properties between pores are easily secured, and the pressure loss decrease effect of the surface layer during the PM deposition increases. In addition, even in a structure having a large porosity, excellent strength can easily be developed.

In the preferable embodiment of the first honeycomb filter of the present invention, the fibers contained in the surface layer are constituted of, as the main component, at least one material selected from the material group consisting of aluminosilicate, alumina, silica, zirconia, ceria and mullite, and hence the filter has excellent thermal resistance.

In the preferable embodiment of the first honeycomb filter of the present invention, since the fibers contained in the surface layer have an average diameter of 0.5 µm or more and less than 8 µm, and an average length of 100 µm or more and less than 500 µm, the high structural strength of the honeycomb filter is easily held, the pore diameters of the surface layer are easily decreased, and high porosity is easily held. If the average diameter of the fibers is less than 0.5 µm, the structural strength is not easily maintained. If the average diameter is 8 µm or more, it is difficult to control both the decreasing of the pore diameters and the maintaining of the high porosity. If the fibers have an average length of less than 100 µm (are excessively short), the fibers easily stick into the pores of the partition wall base material, and eventually the pores might be affected and clogged. On the other hand, if the fibers have an average length of 500 µm or more (are excessively long), it is difficult to control the thickness of the surface layer.

In the preferable embodiment of the first honeycomb filter of the present invention, the fibers are the bio-soluble fibers. Therefore, even if the fibers are released to the atmosphere and sucked into a human body (lungs), health is not affected.

In the preferable embodiment of the first honeycomb filter of the present invention, since the surface layer carries the (oxidation) catalyst containing one or both of platinum and palladium, the oxidation of the deposited PM can be promoted. Specifically, since the surface layer has a porosity higher than that of the partition wall base material and has a large surface area, when the surface layer carries the oxidation catalyst, as compared with a case where the catalyst is carried in the pores of a conventional partition wall base material, contact frequency between the catalyst and the PM can be increased, and the oxidation of the deposited PM can further be promoted. In consequence, the small amount of the deposited PM can be maintained, and the pressure loss during the PM deposition can be decreased.

The second honeycomb filter of the present invention comprises the partition walls having the porous partition wall base material and the surface layer provided on only the inflow side or both the inflow side and the outflow side of the partition wall base material, and the surface layer provided on at least the inflow side of the partition wall base material is constituted of a catalyst layer containing at least one material selected from the material group consisting of alumina, zirconia, titanic, zeolite and ceria. Moreover, (I) the peak pore diameter of the surface layer is equal to or smaller than the average pore diameter of the partition wall base material, and the porosity of the surface layer is larger than that of the partition wall base material, (II) the surface layer has a peak pore diameter of 0.3 µm or more and less than 20 µm and a porosity of 60% or more and less than 95% (the measurement method is the mercury porosimetry), (III) the thickness L1 of the surface layer is 0.5% or more and less than 30% of the thickness L2 of the partition walls, (IV) the mass of the surface layer per filtration area is 0.01 mg/cm$^2$ or more and less than 6 mg/cm$^2$, and (V) the partition wall base material has an average pore diameter of 10 µm or more and less than 60 µm and a porosity of 40% or more and less than 65%. Therefore, in the same manner as in the first honeycomb filter, the satisfactory PM trapping efficiency is maintained. Moreover, there is not any rapid pressure loss increase immediately after the PM trapping starts (in the initial stage of the PM deposition) (the above problem (a) can be solved). The relation between the amount of the deposited PM and the pressure loss does not have any hysteresis characteristics (the above problem (b) can be solved). In addition to the pressure loss during the PM deposition, the pressure loss in the initial state, in which any PM is not deposited (the honeycomb filter itself), can be minimized (the above problem (c) can be solved).

In the preferable embodiment of the second honeycomb filter according to the present invention, since the hydraulic diameters of the cells in the end face on the inlet side of the fluid are preferably equal to or larger than those of the cells in the end face on the outlet side of the fluid, a contact area between the exhaust gas and the catalyst layer (the surface layer) is increased. A compact honeycomb filter which has excellent purification efficiency and which can be mounted even in a limited space can be obtained.

In the preferable embodiment of the second honeycomb filter according to the present invention, since the partition walls have a permeability of $0.5 \times 10^{-12}$ m$^2$ or more, the exhaust gas easily passes through the partition walls, and the PM contained in the exhaust gas is hardly trapped in the partition walls. Therefore, there is only small pressure loss. Even when the honeycomb filter is used for a long period, the pressure loss does not easily increase.

In the preferable embodiment of the second honeycomb filter of the present invention, since the surface layer constituted of the catalyst layer carries the fine particles of one or both of platinum and palladium, in the same manner as in the preferable embodiment of the first honeycomb filter, the oxidation of the deposited PM can be promoted. Specifically, the surface layer has a porosity higher than that of the partition wall base material and has a large surface area. Therefore, when the surface layer carries the oxidation catalyst, as compared with a case where the catalyst is carried in the pores of the conventional partition wall base material, the contact frequency between the catalyst and the PM can be increased, and the oxidation of the deposited PM can further be promoted. In consequence, the small amount of the deposited PM can be maintained, and the pressure loss during the PM deposition can be decreased. That is, the PM trapped by the surface layer frequently comes in contact with the catalyst containing a noble metal (one or both of platinum and palladium), the oxidation of the PM is promoted, and the amount of the PM to be deposited for a certain time can be decreased. Moreover, even in forced regeneration, in which the PM is forcibly oxidized and removed by high-temperature gas, required time can be shortened, and a fuel necessary for increasing the gas temperature can be saved.

The first, second and third honeycomb filter manufacturing methods of the present invention exhibit an excellent effect in that the first honeycomb filter of the present invention, which is an embodiment in which the surface layer contains 70 mass % or more of ceramic or metal fibers, can satisfactorily be prepared. The fourth honeycomb filter manufacturing method of the present invention exhibits an excellent effect in that the first honeycomb filter of the present invention, which is an embodiment in which the partition wall base material and the surface layer are constituted of the same material as the main component, can satisfactorily be prepared. The fifth honeycomb filter manufacturing method of the present invention exhibits an excellent effect in that the second honeycomb filter of the present invention can satisfactorily be prepared.

DESCRIPTION OF REFERENCE NUMERALS

Figure 1:
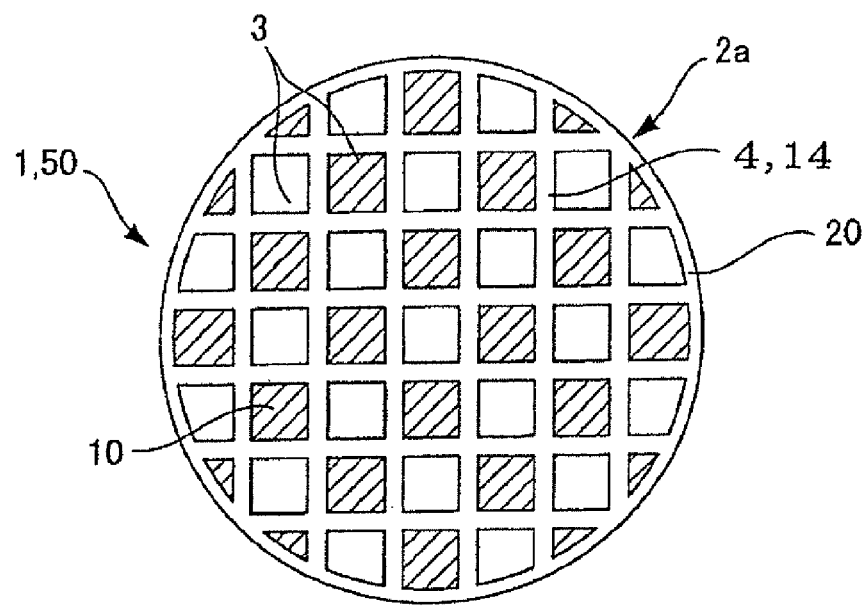
FIG. 1 is a front view schematically showing one embodiment of a honeycomb filter of the present invention.

1: honeycomb filter, 2a, 2b: end face, 3: cell, 4: partition wall base material, 10: plugging portion, 14: partition wall, 20: outer peripheral wall, 24: surface layer, 50: honeycomb structure, 100: test piece, 105: remaining (partition wall) rib.

BEST MODE FOR CARRYING OUT THE INVENTION

The present invention will hereinafter be described in accordance with embodiments appropriately with reference to the drawings, but the present invention should not be limited to these embodiments when interpreted. The present invention can variously be changed, modified, improved or replaced based on the knowledge of any person skilled in the art within the range of not deviating from the gist of the present invention. For example, the drawings show preferable embodiments of the present invention, but the present invention is not restricted by any embodiment or information shown in the drawings. To implement or verify the present invention, a means similar or equivalent to the means described in the present description may be applied, but the preferable means is the following means.

[Honeycomb Filter] First, a respect common to the first honeycomb filter and the second honeycomb filter will be described. In a honeycomb filter 1 shown in FIGS. 1 to 3, a honeycomb structure 50 provided with a porous partition wall base material 4 which separates and forms a plurality of cells 3 functioning as the flow paths of fluid in an inner part surrounded by an outer peripheral wall 20 is provided with plugging portions 10 which plug the ends of the cells 3, and is further provided with a surface layer 24 on (only) the inflow side of the partition wall base material 4. That is, in the honeycomb filter 1, the partition wall base material 4 and the surface layer 24 constitute partition walls 14. It is to be noted that in FIGS. 1 and 2, the surface layer is omitted and is not drawn.

The partition wall base material 4 (the partition walls 14) is arranged so as to form the plurality of cells 3 which connect two end faces 2a, 2b to each other, and the plugging portions 10 are arranged so as to plug the cells 3 in one of the end faces 2a, 2b. The plugging portions 10 are present so that the adjacent cells 3 are plugged in ends opposite to each other (end of one of the end faces 2a, 2b), and consequently, the end face of the honeycomb filter 1 (the honeycomb structure 50) has a checkered pattern (a zigzag pattern) as shown in FIG. 1.

During the use of the honeycomb filter 1, an exhaust gas (the fluid) flows into the cells 3 from one end face 2a side (one end where the predetermined cells 3 open (the end on the end face 2a side)), passes through the partition walls 14 as filter layers from a side provided with the surface layer 24, flows out as the transmitted fluid to the cells 3 (the remaining cells 3) which open on the other end face 2b side, and is discharged externally from the other end face 2b side (the other ends of the remaining cells 3 (the ends on the end face 2b side)). When the exhaust gas passes through the partition walls 4, PM contained in the exhaust gas is trapped by the partition walls 4.

It is to be noted that the outer peripheral wall 20 positioned in the outermost periphery of the honeycomb filter 1 may be an integrally formed wall to be formed integrally with a portion constituted of the partition wall base material 14 during manufacturing (during forming) or a cement-coated wall as an outer peripheral wall formed into a predetermined shape by grinding the outer periphery of the portion constituted of the partition wall base material 14 after the forming and made of a cement or the like. Moreover, the honeycomb filter 1 shows a state in which the plugging portions 10 are arranged so as to plug the cells 3 in the end faces 2a, 2b, but the honeycomb filter of the present invention is not limited to a filter having such an arrangement state of the plugging portions. The plugging portions may be arranged in the cells, and pressure loss decrease may be prioritized rather than a filter performance to employ a configuration in which a part of the cells is not provided with any plugging portion.

The density (the cell density) of the cells 3 of the honeycomb filter 1 is preferably 15 cells/cm$^2$ or more and less than 65 cells/cm$^2$, and the thicknesses of the partition walls 14 are preferably 200 μm or more and less than 600 μm. As a filtration area is large, the pressure loss during PM deposition is decreased. Therefore, when the cell density is large, the pressure loss during the PM deposition lowers. On the other hand, the initial pressure loss increases when the hydraulic diameters of the cells are decreased. In consequence, from the viewpoint of the pressure loss decrease during the PM deposition, the cell density is preferably large, but from the viewpoint of the initial pressure loss decrease, the cell density is preferably small. When the thicknesses of the partition walls 14 are increased, trapping efficiency improves, but the initial pressure loss increases. In consideration of the initial pressure loss, the pressure loss during the PM deposition and the trade-off of the trapping efficiency, the ranges of the cell density and the partition wall thicknesses which satisfy all requirements are set to the above ranges.

The coefficient of thermal expansion in a cells 3 communicating direction of the honeycomb filter 1 (the honeycomb structure 50) at 40 to 800° C. is preferably less than $1.0 \times 10^{-6}$/° C., further preferably less than $0.8 \times 10^{-6}$/° C., especially preferably less than $0.5 \times 10^{-6}$/° C. When the coefficient of the thermal expansion in the cell connecting direction at 40 to 800° C. is less than $1.0 \times 10^{-6}$/° C., thermal stress generated during exposure to high-temperature exhaust gas can be suppressed to an allowable range, and the collapse of the honeycomb filter due to the thermal stress can be prevented.

Figure 2:
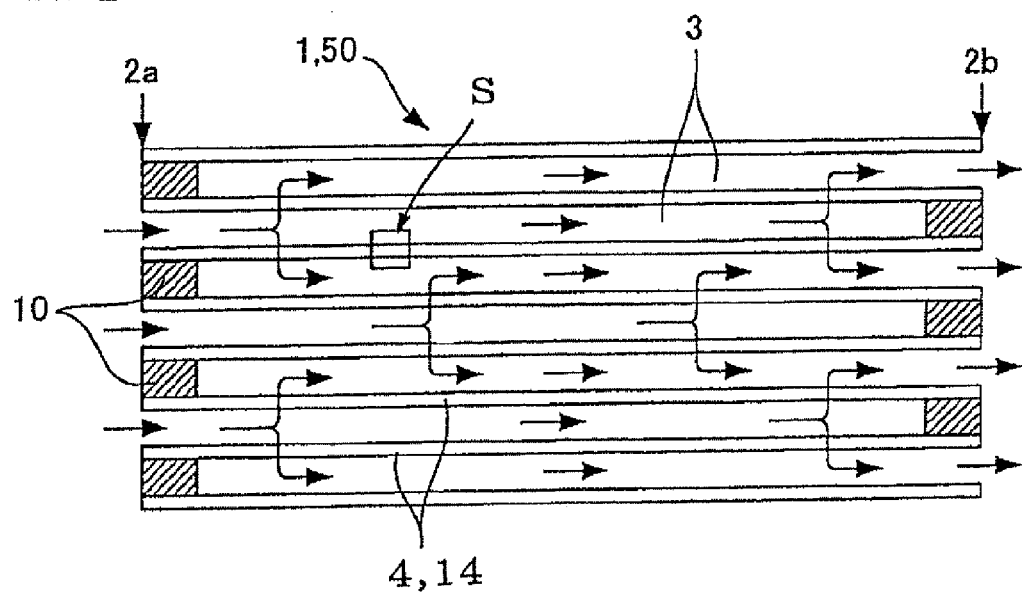
FIG. 2 is a sectional view schematically showing the embodiment of the honeycomb filter of the present invention.

Moreover, as shown in FIGS. 1 and 2, the whole shape of the honeycomb structure 1 is a columnar shape (a cylindrical shape), and the shape of the cells 3 is a quadrangular shape (the shape of a section cut along the surface vertical to the cells 3 communicating direction, that is, the diametric direction of the honeycomb filter 1), but there is not any special restriction on the whole shape of the honeycomb filter of the present invention and the cell shape. Examples of the whole shape include an elliptic pole shape, an oblong pole shape and a polygonal pole shape such as a quadrangular pole shape or a triangular pole shape, and a hexagonal shape, a triangular shape or the like may be employed as the cell shape.

Figure 4:
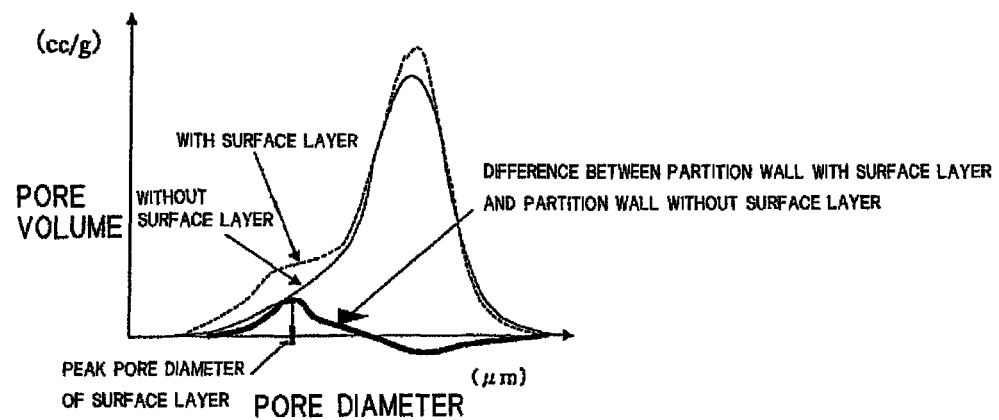
FIG. 4 is a diagram showing the embodiment of the honeycomb filter according to the present invention and is a graph showing a pore distribution obtained by mercury porosimetry.

[First Honeycomb Filter] When the honeycomb filter 1 is a first honeycomb filter, the peak pore diameter of the surface layer 24 is equal to or smaller than the average pore diameter of the partition wall base material 4. Moreover, the surface layer 24 has a peak pore diameter of 0.3 μm or more and less than 20 μm. This peak pore diameter is a pore diameter constituting the peak of a pore distribution. In the present specification, the pore distribution of pores in the partition wall base material is represented by values measured by mercury porosimetry. The pore distribution, an average pore diameter and pore diameters described later can be measured using, for example, trade name: Porosimeter Model 9810 manufactured by Shimadzu Corporation. FIG. 4 is a graph showing the pore distribution obtained by the mercury porosimetry and showing a relation between pore volumes and the pore diameters. In the present description, as to the peak pore diameter of the surface layer, a difference between the measurement result of the pore distribution of the partition walls (still provided with the surface layer (with the surface layer)) and the measurement result of the pore distribution in a case where the surface layer which does not include any transition layer (a boundary between the surface layer and the partition wall base material) has been removed (corresponding to the partition wall base material without the surface layer) is regarded as the pore distribution of the surface layer, and the peak pore diameter is defined by the peak of the distribution (see FIG. 4).

Figure 3:
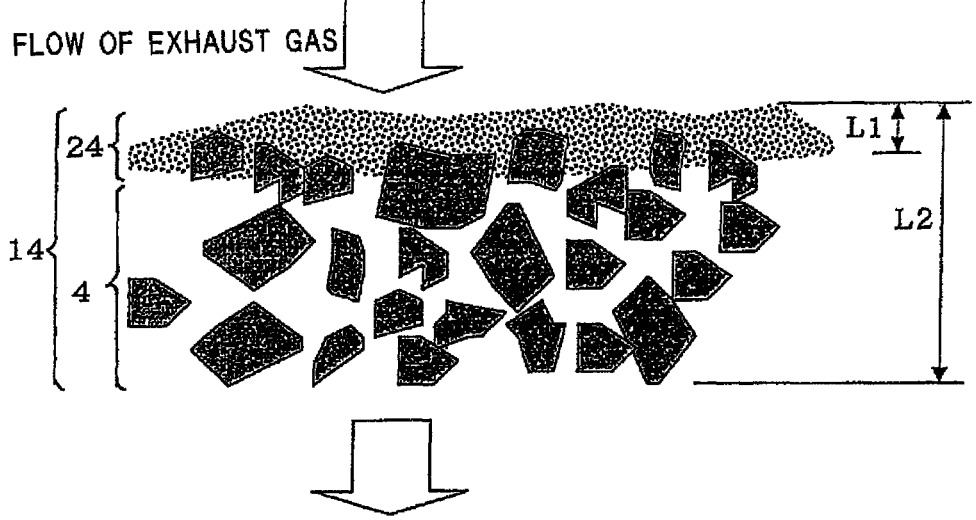
FIG. 3 is a partial sectional view showing an enlarged S part in FIG. 2.
Figure 5:
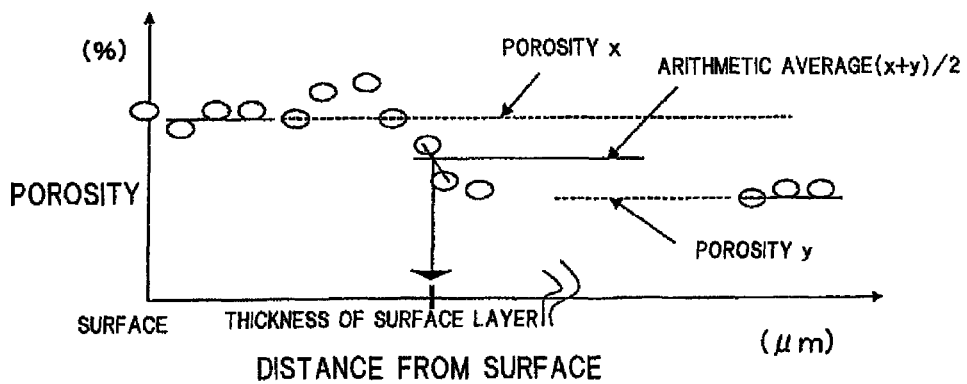
FIG. 5 is a diagram showing the embodiment of the honeycomb filter of the present invention, and is a graph showing a relation between a distance from the surface of the partition wall and a porosity.

When the honeycomb filter 1 is the first honeycomb filter, the thickness L1 of the surface layer 24 is 0.5% or more and less than 30% of the thickness L2 of the partition walls 14 (see FIG. 3). In the present specification, the thickness of the surface layer is obtained by analyzing the image of the section of the partition wall through a scanning electron microscope (SEM) (see FIG. 5). FIG. 5 is a graph showing a relation between a distance from the surfaces of the partition walls of the honeycomb filter and the porosity. To obtain the thickness of the surface layer, first a region having a thickness of a half of the thickness of each partition wall is divided into 1000 or more in a thickness direction, the porosity in the square of each divided region is measured as a space/solid area ratio from a region close to the surface, and the ratios are plotted with respect to the distance from the surface. It is to be noted that the average value of 20 view fields in each distance is plotted. Moreover, the average of three points close to the surface excluding one point closest to the surface is obtained as the porosity of the surface layer (referred to as the porosity x). On the other hand, in a position (the center of each partition wall in the thickness direction) disposed sufficiently away from the surface, the average space/solid area ratio of 20 square view fields (one side of a square has a thickness of 1/1000 of that of each partition wall) is measured, and the ratio is obtained as the porosity of the partition wall base material (referred to as the porosity y). Moreover, a position (the distance from the surface) where a straight line obtained by the arithmetic average of the porosities x and y intersects with a straight line connecting the aforementioned plots is defined as the thickness (the depth) of the surface layer.

When the honeycomb filter 1 is the first honeycomb filter, the mass of the surface layer 24 per filtration area is 0.01 mg/cm$^2$ or more and less than 6 mg/cm$^2$. A method of obtaining the mass of the surface layer 24 per filtration area will be described later in the paragraphs of examples.

When the honeycomb filter 1 is the first honeycomb filter, the average pore diameter of the partition wall base material 4 is 10 μm or more and less than 60 μm. In the present specification, the average pore diameter of the partition wall base material is a value measured by the mercury porosimetry. The average pore diameter of the partition wall base material 4 is obtained by cutting out one partition wall, grinding and removing the surface layer and measuring the diameter of the remaining part (corresponding to the partition wall base material).

When the honeycomb filter 1 is the first honeycomb filter, the porosity of the surface layer 24 is larger than that of the partition wall base material 4. Moreover, the porosity of the surface layer 24 is 60% or more and less than 95%, and the porosity of the partition wall base material 4 is 40% or more and less than 65%. In the present specification, the porosity is a value measured by a water immersion process and represented by vol % (simply represented by % in the present specification). The porosity of the partition wall base material is obtained by cutting out one partition wall, grinding and removing the surface layer and measuring the porosity of the remaining portion (corresponding to the partition wall base material).

[Second Honeycomb Filter] When the honeycomb filter 1 is a second honeycomb filter, the surface layer 24 provided on at least the inflow side of the partition wall base material 4 is constituted of a catalyst layer. That is, in the second honeycomb filter, the catalyst is not carried by the surface layer 24 constituted of the same material as that of the partition wall base material 4, and the surface layer 24 itself is formed of the catalyst. Moreover, the peak pore diameter of the surface layer 24 is equal to or smaller than the average pore diameter of the partition wall base material 4, and the porosity of the surface layer 24 is larger than that of the partition wall base material 4. The surface layer 24 has a peak pore diameter of 0.3 μm or more and less than 20 μm and a porosity of 60% or more and less than 95%. The mass of the surface layer 24 per filtration area is 0.01 mg/cm$^2$ or more and less than 6 mg/cm$^2$. The partition wall base material 4 has a porosity of 40% or more and less than 65% and an average pore diameter of 10 μm or more and less than 60 μm. The thickness L1 of the surface layer 24 is 0.5% or more and less than 30% of the thickness L2 of the partition wall 14.

When the honeycomb filter 1 is the second honeycomb filter, the hydraulic diameter of the cell 3 in the end face 2a on, the inlet side of the exhaust gas is preferably equal to or larger than that of the cell 3 in the end face 2b on the outlet side, and the partition walls 14 preferably have a permeability of $0.5 \times 10^{-12}$ m$^2$ or more.

Figure 7:
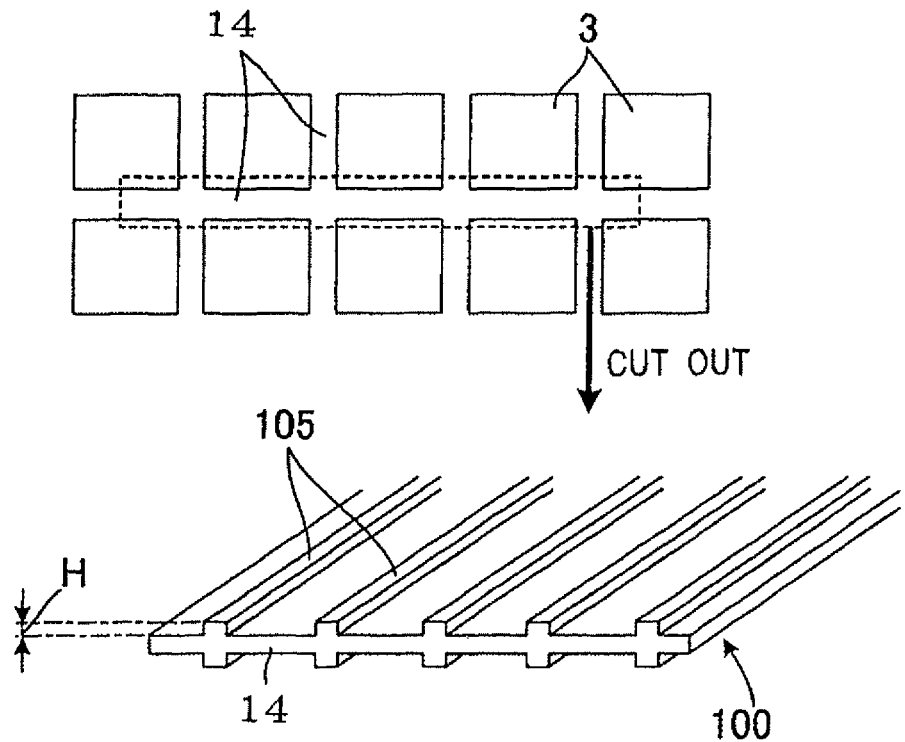
FIG. 7 is a schematic diagram showing a test piece for use in the measurement of permeability.

As to the permeability, as shown in FIG. 7, room-temperature air is passed through a square-plate-like or disc-like test piece 100 obtained by cutting the partition wall 14 so that a remaining rib 105 has a height H of 0.2 mm or less, passage resistance in this case is measured, and the permeability is obtained by the above equation (1). At this time, a fluidity seal such as a grease is preferably used together so that air does not leak from a gap between the remaining rib 105 and the seal.

Moreover, as an air flow rate range, there is used a measurement result in a range in which a calculated partition wall 14-passing flow rate is 0.1 cm/sec or more and 1 cm/sec or less.

[First, Second and Third Honeycomb Filter Manufacturing Methods] Next, first, second and third honeycomb filter manufacturing methods of the present invention will be described. In the first, second and third honeycomb filter manufacturing methods of the present invention, when the above honeycomb filter 1 is, for example, the first honeycomb filter, to prepare the filter, the honeycomb structure 50 is beforehand prepared as a fired article. The honeycomb structure (the honeycomb structure 50) is preferably prepared as a plugged honeycomb structure in which the ends of the cells 3 are plugged by the plugging portions 10 before providing a surface layer. There is not any special restriction on means for obtaining the honeycomb structure (the plugged honeycomb structure). The honeycomb structure can be prepared by, for example, the following method.

First, materials such as the examples of the material for the partition wall base material of the honeycomb filter are mixed and kneaded to form kneaded clay. When, for example, cordierite is used as the material for the partition wall base material, a dispersion medium such as water, and a pore former are added to a cordierite-forming material, and they are further an organic binder and a dispersant are added thereto, and kneaded to form the kneaded clay. There is not any special restriction on the means for kneading the cordierite-forming material (a forming material) to prepare the kneaded clay, and examples of the means include a method using, for example, a kneader, a vacuum clay kneader or the like.

The cordierite-forming material means a material which constitutes cordierite when fired and is a ceramic material blended so as to form a chemical composition in a range of 42 to 56 mass % of silica, 30 to 45 mass % of alumina and 12 to 16 mass % of magnesia. Specific examples of the material include a material containing a plurality of inorganic materials selected from the group consisting of talc, kaoline, calcined kaoline, alumina, aluminum hydroxide and silica at such a ratio as to form the above chemical composition. There is not any special restriction on the pore former as long as the pore former has properties that the pore former flies, scatters and disappears in a firing step, and an inorganic substance such as coke, a polymer compound such as a resin balloon, an organic substance such as starch and the like may be used alone or as a combination of them. As the organic binder, hydroxypropylmethyl cellulose, methyl cellulose, hydroxyethyl cellulose, carboxylmethyl cellulose, polyvinyl alcohol or the like may be used. They may be used alone or as a combination of two or more of them. As the dispersant, ethylene glycol, dextrine, fatty acid soap, polyalcohol or the like may be used. They may be used alone or as a combination of two or more of them.

Then, the resultant clay is formed into a honeycomb shape to prepare a formed honeycomb article. There is not any special restriction on a method for preparing the formed honeycomb article, and a heretofore known forming method such as extrusion, injection or pressing may be used. Above all, preferable examples of the method include a method of extruding the clay prepared as described above by use of a die having a desired cell shape, partition wall thickness and cell density.

Subsequently, for example, both ends of the resultant formed honeycomb article are plugged. For example, plugging slurry containing the cordierite-forming material, water or alcohol, and an organic binder is beforehand stored in a container, and one end face of the formed honeycomb article is masked so that cells are alternately plugged to form a checked pattern (a zigzag pattern). Then, the masked end-face-side end of the article is immersed in the container, and cells which are not masked are filled with the plugging slurry to form plugging portions (the plugging portions 10). The other end of each cell having one end plugged is masked, and the plugging portions are formed in the same manner as in forming the plugging portions of the one end. In consequence, the formed honeycomb article has a structure in which the other end of each cell having the one end opened (which is not plugged) is plugged, and the cells are alternately plugged so as to form the checkered patterns in the one end and the other end.

Then, the formed honeycomb article plugged as described above is dried to prepare a dried honeycomb article. There is not any special restriction on the drying means, and a heretofore known drying method such as hot air drying, microwave drying, dielectric drying, pressure reduction drying, vacuum drying or freeze drying may be used. Above all, a drying method in which hot air drying is combined with microwave drying or dielectric drying is preferable in that the whole formed article can quickly and uniformly be dried.

Next, the resultant dried honeycomb article is calcined to prepare a calcined article before finally fired. The calcination means an operation of burning and removing organic matter (the organic binder, the dispersant, the pore former or the like) in the formed honeycomb article. In general, the burning temperature of the organic binder is in the range of about 100 to 300° C., and the burning temperature of the pore former is in the range of about 200 to 800° C., so that the calcining temperature may be set to about 200 to 1000° C. There is not any special restriction on calcining time, but the time is usually in the range of about 10 to 100 hours.

Then, the resultant calcined article is fired (finally fired) to obtain a (plugged) honeycomb structure. In the present specification, the final firing means an operation of sintering the forming material in the calcined article to densify the article and secure predetermined strength. Firing conditions (temperature and time) vary in accordance with the type of the forming material, and hence appropriate conditions may be selected in accordance with the type of the material. To fire the cordierite-forming material, the material is preferably fired at 1410 to 1440° C. Moreover, the material is preferably fired for about three to ten hours.

After obtaining the plugged honeycomb structure, the surface layer 24 is provided on (only) the inflow side of the partition wall base material 4 (in the case of the honeycomb filter 1) by a method peculiar to each of the first, second and third honeycomb filter manufacturing methods of the present invention described above, whereby the honeycomb filter 1 can be obtained.

[Fourth Honeycomb Filter Manufacturing Method] Next, the fourth honeycomb filter manufacturing method of the present invention will be described. In the fourth honeycomb filter manufacturing method according to the present invention, when the honeycomb filter 1 is, for example, the first honeycomb filter, to prepare the filter, the formed honeycomb article is beforehand prepared. There is not any special restriction on the means for obtaining the formed honeycomb article. The formed honeycomb article can be prepared by a means similar to that of the above-mentioned first, second and third honeycomb filter manufacturing methods of the present invention.

First, materials such as the examples of the material for the partition wall base material of the honeycomb filter are mixed and kneaded to form kneaded clay. When, for example, cordierite is used as the material for the partition wall base material, a dispersion medium such as water and a pore former are added to a cordierite-forming material, and further an organic binder and a dispersant are added thereto, and they are kneaded to form the kneaded clay. There is not any special restriction on the means for kneading the cordierite-forming material (a forming material) to prepare the kneaded clay, and examples of the means include a method using, for example, a kneader, a vacuum clay kneader or the like.

The cordierite-forming material is a material containing a plurality of inorganic materials selected from the group consisting of talc, kaoline, calcined kaoline, alumina, aluminum hydroxide and silica at such a ratio as to form a chemical composition in a range of 42 to 56 mass % of silica, 30 to 45 mass % of alumina and 12 to 16 mass % of magnesia. There is not any special restriction on the pore former as long as the pore former has properties that the pore former flies, scatters and disappears in a firing step, and an inorganic substance such as coke, a polymer compound such as a resin balloon, an organic substance such as starch and the like may be used alone or as a combination of them. As the organic binder, hydroxypropylmethyl cellulose, methyl cellulose, hydroxyethyl cellulose, carboxylmethyl cellulose, polyvinyl alcohol or the like may be used. They may be used alone or as a combination of two or more of them. As the dispersant, ethylene glycol, dextrine, fatty acid soap, polyalcohol or the like may be used. They may be used alone or as a combination of two or more of them.

Then, the resultant clay is formed into a honeycomb shape to obtain the formed honeycomb article. There is not any special restriction on the forming means, and a heretofore known forming method such as extrusion, injection or pressing may be used. Above all, preferable examples of the means include a method of extruding the clay prepared as described above by use of a die having a desired cell shape, partition wall thickness and cell density.

After obtaining the formed honeycomb article, slurry (in the case of the honeycomb filter 1) is deposited on only the inflow side of the formed honeycomb article by a method peculiar to the fourth honeycomb filter manufacturing method of the present invention.

Subsequently, both ends of the formed honeycomb article on which the slurry has been deposited are plugged. For example, plugging slurry containing the cordierite-forming material, water or alcohol, and the organic binder is beforehand stored in a container, and one end face of the formed honeycomb article is masked so that cells are alternately plugged to form a checked pattern (a zigzag pattern). Then, the masked end-face-side end of the article is immersed in the container, and cells which are not masked are filled with the plugging slurry to form plugging portions (the plugging portions 10). The other end of each cell having one end plugged is masked, and the plugging portions are formed in the same manner as in forming the plugging portions of the one end. In consequence, the formed honeycomb article has a structure in which the other end of each cell having the one end opened (which is not plugged) is plugged, and the cells are alternately plugged so as to form the checkered patterns in the one end and the other end.

Then, the formed honeycomb article plugged as described above is dried to prepare a dried honeycomb article. There is not any special restriction on the drying means, and a heretofore known drying method such as hot air drying, microwave drying, dielectric drying, pressure reduction drying, vacuum drying or freeze drying may be used. Above all, a drying method in which the hot air drying is combined with the microwave drying or the dielectric drying is preferable in that the whole formed article can quickly and uniformly be dried.

Next, the resultant dried honeycomb article is calcined to prepare a calcined article before finally fired. The calcining is an operation of burning and removing an organic matter (the organic binder, the dispersant, the pore former or the like) in the formed honeycomb article. In general, the burning temperature of the organic binder is in the range of about 100 to 300° C., and the burning temperature of the pore former is in the range of about 200 to 800° C., so that the calcining temperature may be set to about 200 to 1000° C. There is not any special restriction on calcining time, but the time is usually in the range of about 10 to 100 hours.

Then, the resultant calcined article is fired (finally fired) to obtain the honeycomb filter 1 provided with the surface layer 24 on (only) the inflow side of the partition wall base material 4 and having the plugging portions 10. Firing conditions (temperature and time) vary in accordance with the type of the forming material, and hence appropriate conditions may be selected in accordance with the type of the material. To fire the cordierite-forming material, the material is preferably fired at 1410 to 1440° C. Moreover, the material is preferably fired for about three to ten hours.

[Fifth Honeycomb Filter Manufacturing Method] Next, the fifth honeycomb filter manufacturing method of the present invention will be described. In the fifth honeycomb filter manufacturing method of the present invention, when the honeycomb filter 1 is, for example, the second honeycomb filter, to prepare the filter, the honeycomb structure 50 is beforehand prepared as a fired article. The honeycomb structure (the honeycomb structure 50) is preferably beforehand prepared as a plugged honeycomb structure in which an end of each of the cells 3 is plugged with the plugging portions 10 before providing a surface layer. Means for obtaining the honeycomb structure (the plugged honeycomb structure) is the same as the above-mentioned first, second and third honeycomb filter manufacturing methods of the present invention.

After obtaining the plugged honeycomb structure, the surface layer 24 is provided on (only) the inflow side of the partition wall base material 4 by a method peculiar to the above-mentioned fifth honeycomb filter manufacturing method of the present invention, whereby the honeycomb filter 1 can be obtained.

EXAMPLES

The present invention will hereinafter specifically be described in accordance with examples, but the present invention is not limited to these examples.

Example 1

[Preparation of Formed Honeycomb Article] As cordierite-forming materials, alumina, aluminum hydroxide, kaoline, talc and silica were used, and 13 parts by mass of a pore former, 35 parts by mass of a dispersion medium, 6 parts by mass of an organic binder and 0.5 part by mass of a dispersant were added to 100 parts by mass of cordierite-forming material, mixed and kneaded to prepare kneaded clay. Water was used as the dispersion medium, coke having an average particle diameter of 10 μm was used as the pore former, hydroxypropyl methyl cellulose was used as the organic binder, and ethylene glycol was used as the dispersant. Subsequently, the kneaded clay was extruded using a predetermined die to obtain a formed honeycomb article having a quadrangular cell shape and the whole columnar (cylindrical) shape.

[Preparation of Plugged Honeycomb Structure] The formed honeycomb article was dried by microwave drying, and further completely dried by a hot air drier, and then both end faces of the formed honeycomb article were cut and adjusted to a predetermined dimension. Then, cell openings in one end face of the formed honeycomb article were alternately masked in a checkered pattern (a zigzag pattern), and the masked end was immersed in plugging slurry containing the cordierite-forming material to form plugging portions alternately arranged in the checkered pattern. As to the other end, each cell having one end plugged was masked, and plugging portions were formed by a method similar to that for forming the plugging portions in the one end. Afterward, the formed honeycomb article provided with the plugging portions was dried with a hot air drier and further fired at 1410 to 1440° C. for five hours to obtain a plugged honeycomb structure.

[Forming of Surface Layer (Preparation of Honeycomb Filter)] (Method 1) Aluminosilicate fibers as a fibrous material having an average diameter of 3 μm and an average length of 105 μm, silica as a bonding material having an average particle diameter of 1 μm and cellulose as the organic binder were used in such an amount as to obtain a mass ratio of 90:10:5, and the whole material having a mass of 100 g was mixed with five liters of water to obtain slurry for a surface layer. Then, the slurry was introduced into a needle type atomizer having a nozzle hole diameter of 1.5 mm, atomized with a pneumatic pressure of 0.15 MPa, and deposited on the inflow side of a partition wall base material of the resultant plugged honeycomb structure. Afterward, the structure was dried at 130° C. for one hour and then fired at 700° C. for one hour to obtain a honeycomb filter in which the plugged honeycomb structure was provided with the surface layer.

[Evaluation of Honeycomb Filter] The resultant honeycomb filter had a columnar shape (a cylindrical shape) with a diameter of 144 mm and a length of 152 mm. As to this honeycomb filter, by the following methods, a surface layer thickness $L_1$, a partition wall thickness $L_2$, a surface layer peak pore diameter, a surface layer porosity, a partition wall base material average pore diameter, a partition wall base material porosity, and surface layer thicknesses and masses in positions on an inlet side, in the center and on an outlet side were measured. Moreover, the honeycomb filter was evaluated for an initial trapping efficiency, pressure loss during PM deposition, an initial pressure loss increase ratio and hysteresis characteristics. The results are shown in Table 1 together with a surface layer forming means, a cell density, a ratio of the surface layer thickness $L_1$ to the partition wall thickness $L_2$, a surface layer fiber content, surface layer fiber average diameter and average length and general evaluation. It is to be noted that in the general evaluation, circles are indicated for examples in which positive evaluations (described later) were obtained for the initial trapping efficiency, the pressure loss during the PM deposition, the initial pressure loss increase ratio and the hysteresis characteristics, and the other examples were crossed. The average pore diameter, the pore distribution and the porosity were measured using trade name: Porosimeter Model 9810 manufactured by Shimadzu Corporation. The inlet side as the measurement target of the surface layer thickness and mass means a position of 20 mm from the end face of the honeycomb filter on the inflow side of an exhaust gas, the outlet side means a position of 20 mm from the end face of the honeycomb filter on the outflow side of the exhaust gas, and the center means a central position (the center in an axial direction) between both end faces of the columnar honeycomb filter. The surface layer thickness $L_1$ is an average value of surface layer thicknesses measured in ten positions in total including the positions on the inlet side, in the center and on the outlet side.

TABLE 1

| | | | | Surface layer | | | | Surface layer fiber | |
| | Surface layer forming means | Cell density (cells/cm²) | Partition wall thickness L2 (um) | Surface layer thickness L1 (um) | L1/L2 (%) | peak pore diameter (um) | Surface layer porosity (%) | Surface layer fiber content (mass %) | Average diameter (um) | Average length (um) |
|---|---|---|---|---|---|---|---|---|---|---|
| Example 1 | Method 1 | 46.5 | 300 | 30 | 10 | 3 | 90 | 90 | 3 | 105 |
| Example 2 | Method 1 | 46.5 | 300 | 9 | 3 | 1.2 | 90 | 85 | 0.6 | 50 |
| Example 3 | Method 1 | 46.5 | 300 | 39 | 13 | 8 | 85 | 80 | 5 | 150 |
| Example 4 | Method 1 | 46.5 | 300 | 1.8 | 0.6 | 0.3 | 90 | 80 | 0.3 | 6 |
| Example 5 | Method 1 | 46.5 | 300 | 84 | 28 | 14 | 77 | 80 | 6 | 300 |
| Example 6 | Method 1 | 15 | 600 | 30 | 5 | 8 | 90 | 90 | 6 | 300 |
| Example 7 | Method 1 | 65 | 200 | 30 | 15 | 8 | 90 | 90 | 6 | 300 |
| Example 8 | Method 1 | 46.5 | 300 | 30 | 10 | 8 | 90 | 90 | 6 | 300 |
| Example 9 | Method 1 | 46.5 | 300 | 30 | 10 | 8 | 90 | 90 | 6 | 300 |
| Example 10 | Method 1 | 46.5 | 300 | 30 | 10 | 8 | 90 | 90 | 6 | 300 |
| Example 11 | Method 1 | 46.5 | 300 | 30 | 10 | 8 | 90 | 35 | 6 | 300 |
| Example 12 | Method 1 | 46.5 | 300 | 30 | 10 | 8 | 90 | 26 | 6 | 300 |
| Example 13 | Method 1 | 46.5 | 300 | 30 | 10 | 8 | 90 | 0 | — | — |
| Example 14 | Method 1 | 46.5 | 300 | 39 | 13 | 8 | 85 | 80 | 0.4 | 50 |
| Example 15 | Method 1 | 46.5 | 300 | 39 | 13 | 8 | 85 | 80 | 12 | 600 |
| Example 16 | Method 2 | 46.5 | 300 | 60 | 20 | 14 | 77 | 80 | 6 | 300 |
| Example 17 | Method 3 | 46.5 | 300 | 66 | 22 | 14 | 77 | 80 | 6 | 300 |
| Example 18 | Method 1 | 46.5 | 300 | 84 | 28 | 14 | 75 | 0 | — | — |
| Example 19 | Method 1 | 46.5 | 300 | 84 | 28 | 14 | 77 | 80 | 6 | 300 |
| Comparative Example 1 | No surface layer | 46.5 | 300 | 0 | 0 | — | — | — | — | — |
| Comparative Example 2 | Method 1 | 46.5 | 300 | 0.9 | 0.3 | 0.12 | 90 | 90 | 3 | 105 |
| Comparative Example 3 | Method 1 | 46.5 | 300 | 120 | 40 | 18 | 90 | 90 | 3 | 105 |
| Comparative Example 4 | Method 1 | 46.5 | 300 | 30 | 10 | 8 | 55 | 90 | 3 | 105 |
| Comparative Example 5 | Method 1 | 46.5 | 300 | 30 | 10 | 8 | 97 | 90 | 3 | 105 |

TABLE 1-continued

| | | | | | | | | | | |
|---|---|---|---|---|---|---|---|---|---|---|
| Comparative Example 6 | Method 1 | 46.5 | 300 | 30 | 10 | 20 | 90 | 90 | 3 | 105 |
| Comparative Example 7 | Method 1 | 46.5 | 300 | 30 | 10 | 3 | 52 | 90 | 3 | 105 |
| Comparative Example 8 | Method 1 | 46.5 | 300 | 30 | 10 | 8 | 90 | 90 | 3 | 105 |
| Comparative Example 9 | Method 1 | 46.5 | 300 | 30 | 10 | 8 | 90 | 90 | 3 | 105 |
| Comparative Example 10 | Method 1 | 46.5 | 300 | 33 | 13 | 8 | 85 | 80 | 0.2 | 50 |
| Comparative Example 11 | Method 1 | 46.5 | 300 | 39 | 13 | 8 | 85 | 80 | 18 | 600 |
| Comparative Example 12 | Method 1 | 46.5 | 300 | 0.7 | 0.23 | 0.12 | 95 | 90 | 3 | 105 |
| Comparative Example 13 | Method 1 | 46.5 | 300 | 150 | 50 | 18 | 80 | 90 | 3 | 105 |

| | Partition wall | | Surface layer thickness (um) | | | Surface layer mass (mg/cm$^2$) | | |
|---|---|---|---|---|---|---|---|---|
| | base material average pore diameter (mm) | Partition wall base material porosity (%) | Position of 20 mm from inlet-side end face | Center | Position of 20 mm from outlet-side end face | Position of 20 mm from inlet-side end face | Center | Position of 20 mm from outlet-side end face |
| Example 1 | 25 | 52 | 35 | 28 | 38 | 0.75 | 0.6 | 0.814 |
| Example 2 | 25 | 52 | 11 | 6 | 11 | 0.225 | 0.12 | 0.225 |
| Example 3 | 25 | 52 | 50 | 30 | 52 | 1.463 | 0.88 | 1.521 |
| Example 4 | 25 | 52 | 2.5 | 1.5 | 2.5 | 0.045 | 0.03 | 0.045 |
| Example 5 | 25 | 52 | 95 | 75 | 100 | 4.83 | 3.81 | 5.084 |
| Example 6 | 25 | 52 | 35 | 28 | 38 | 0.75 | 0.6 | 0.814 |
| Example 7 | 25 | 52 | 35 | 28 | 38 | 0.75 | 0.6 | 0.814 |
| Example 8 | 11 | 42 | 35 | 28 | 38 | 0.75 | 0.6 | 0.814 |
| Example 9 | 55 | 63 | 35 | 28 | 38 | 0.75 | 0.6 | 0.814 |
| Example 10 | 25 | 52 | 30 | 30 | 30 | 0.75 | 0.75 | 0.75 |
| Example 11 | 25 | 52 | 35 | 28 | 38 | 0.75 | 0.6 | 0.814 |
| Example 12 | 25 | 52 | 35 | 28 | 38 | 0.75 | 0.6 | 0.814 |
| Example 13 | 25 | 52 | 35 | 28 | 38 | 0.75 | 0.6 | 0.814 |
| Example 14 | 25 | 52 | 50 | 30 | 52 | 1.463 | 0.88 | 1.521 |
| Example 15 | 25 | 52 | 50 | 30 | 52 | 1.463 | 0.88 | 1.521 |
| Example 16 | 25 | 52 | 70 | 50 | 80 | 3.45 | 2.46 | 3.943 |
| Example 17 | 25 | 52 | 95 | 48 | 100 | 3.795 | 1.92 | 3.995 |
| Example 18 | 25 | 52 | 90 | 70 | 100 | 5.5 | 4 | 6.2 |
| Example 19 | 45 | 52 | 90 | 70 | 100 | 5.5 | 4 | 6.2 |
| Comparative Example 1 | 25 | 52 | — | — | — | — | — | — |
| Comparative Example 2 | 25 | 52 | 0.9 | 0.9 | 0.9 | 0.023 | 0.02 | 0.023 |
| Comparative Example 3 | 25 | 52 | 120 | 120 | 120 | 3 | 3 | 3 |
| Comparative Example 4 | 25 | 52 | 35 | 28 | 38 | 3.375 | 2.7 | 3.664 |
| Comparative Example 5 | 25 | 52 | 35 | 28 | 38 | 0.225 | 0.18 | 0.244 |
| Comparative Example 6 | 11 | 52 | 35 | 28 | 38 | 0.75 | 0.6 | 0.814 |
| Comparative Example 7 | 65 | 52 | 35 | 28 | 38 | 3.6 | 2.88 | 3.909 |
| Comparative Example 8 | 8 | 38 | 35 | 28 | 38 | 0.75 | 0.6 | 0.814 |
| Comparative Example 9 | 65 | 70 | 35 | 28 | 38 | 0.75 | 0.6 | 0.814 |
| Comparative Example 10 | 25 | 52 | 50 | 30 | 52 | 1.463 | 0.88 | 1.521 |
| Comparative Example 11 | 25 | 52 | 50 | 30 | 52 | 1.463 | 0.88 | 1.521 |
| Comparative Example 12 | 25 | 52 | 0.9 | 0.9 | 0.9 | 0.009 | 0.01 | 0.009 |
| Comparative Example 13 | 25 | 52 | 120 | 120 | 120 | 7.5 | 7.5 | 7.5 |

| | Initial trap efficiency | | Pressure loss during PM deposition | | Initial pressure loss increase ratio | | Hysteresis characteristics | | General evaluation |
|---|---|---|---|---|---|---|---|---|---|
| | Evaluation | (%) | Evaluation | — | Evaluation | (%) | Evaluation | (%) | |
| Example 1 | ◯ | 99 | ◯ | 0.2 | ◯ | 3 | ◯ | 3 | ◯ |
| Example 2 | ◯ | 99 | ◯ | 0.2 | ◯ | 4 | ◯ | 1 | ◯ |
| Example 3 | ◯ | 99 | ◯ | 0.2 | ◯ | 1.5 | ◯ | 1 | ◯ |
| Example 4 | ◯ | 95 | ◯ | 0.3 | ◯ | 6 | ◯ | 3 | ◯ |
| Example 5 | ◯ | 90 | ◯ | 0.4 | ◯ | 0.2 | ◯ | 3 | ◯ |

TABLE 1-continued

| | | | | | | | | | |
|---|---|---|---|---|---|---|---|---|---|
| Example 6 | ○ | 99 | ○ | 0.2 | ○ | 1.5 | ○ | 3 | ○ |
| Example 7 | ○ | 99 | ○ | 0.2 | ○ | 1.5 | ○ | 3 | ○ |
| Example 8 | ○ | 99 | ○ | 0.2 | ○ | 1.5 | ○ | 3 | ○ |
| Example 9 | ○ | 99 | ○ | 0.2 | ○ | 1.5 | ○ | 3 | ○ |
| Example 10 | ○ | 95 | ○ | 0.3 | ○ | 1.5 | ○ | 3 | ○ |
| Example 11 | ○ | 95 | ○ | 0.3 | ○ | 1.5 | ○ | 5 | ○ |
| Example 12 | ○ | 90 | ○ | 0.4 | ○ | 1.5 | ○ | 18 | ○ |
| Example 13 | ○ | 85 | ○ | 0.45 | ○ | 1.5 | ○ | 20 | ○ |
| Example 14 | ○ | 80 | ○ | 0.45 | ○ | 1.5 | ○ | 22 | ○ |
| Example 15 | ○ | 99 | ○ | 0.46 | ○ | 1.5 | ○ | 23 | ○ |
| Example 16 | ○ | 94 | ○ | 0.3 | ○ | 1.5 | ○ | 3 | ○ |
| Example 17 | ○ | 95 | ○ | 0.4 | ○ | 1.5 | ○ | 5 | ○ |
| Example 18 | ○ | 85 | ○ | 0.45 | ○ | 6 | ○ | 5 | ○ |
| Example 19 | ○ | 85 | ○ | 0.2 | ○ | 0.2 | ○ | 1 | ○ |
| Comparative Example 1 | x | 30 | x | 1 | ○ | 0 | x | 70 | x |
| Comparative Example 2 | ○ | 99 | x | 0.9 | x | 11 | ○ | 1 | x |
| Comparative Example 3 | x | 60 | ○ | 0.2 | ○ | 1 | ○ | 1 | x |
| Comparative Example 4 | ○ | 99 | x | 2.5 | ○ | 1.5 | ○ | 3 | x |
| Comparative Example 5 | x | 60 | ○ | 0.2 | ○ | 1.5 | ○ | 3 | x |
| Comparative Example 6 | x | 35 | x | 1.8 | x | 15 | x | 75 | x |
| Comparative Example 7 | ○ | 99 | x | 0.5 | ○ | 1.5 | ○ | 5 | x |
| Comparative Example 8 | ○ | 80 | x | 1.8 | ○ | 1.5 | ○ | 3 | x |
| Comparative Example 9 | x | 55 | x | 0.5 | ○ | 1.5 | ○ | 3 | x |
| Comparative Example 10 | ○ | 80 | x | 0.5 | ○ | 1.5 | x | 43 | x |
| Comparative Example 11 | x | 55 | x | 0.6 | ○ | 1.5 | x | 45 | x |
| Comparative Example 12 | x | 65 | x | 0.9 | x | 11 | ○ | 1 | x |
| Comparative Example 13 | x | 60 | x | 1.1 | x | 15 | ○ | 1 | x |

[Porosity of Partition Wall Base material] The image of the section of a honeycomb filter partition wall was taken through a scanning electron microscope (SEM), an average space/solid area ratio of 20 square view fields (one side of a square had a thickness of 1/1000 of that of each partition wall) was measured in a position (the center of each partition wall in the thickness direction) disposed sufficiently away from the surface of the partition wall, and this ratio was obtained as the porosity of the partition wall base material.

[Porosity of Surface Layer] The image of the section of a honeycomb filter partition wall was taken through an SEM, an average space/solid area ratio of 20 square view fields (one side of a square had a thickness of 1/1000 of that of the partition wall) was measured in each divided region from a region close to the surface, an average of three points close to the surface excluding one point closest to the surface was obtained, and this value was obtained as the porosity of the surface layer.

[Thickness of Partition Wall] The image of the section of a honeycomb filter partition wall was taken through an SEM, and the thickness was measured through the image.

[Thickness of Surface Layer] The image of the section of a honeycomb filter partition wall was taken through an SEM. A region having a thickness of a half of the thickness of the partition wall was divided into 1000 in a thickness direction, the porosity in the square of each divided region was measured as the space/solid area ratio of the image from a region close to the surface, and the average value of 20 view fields in each distance was plotted with respect to a distance from the surface. Then, the distance from the surface in a position where a straight line formed by the arithmetic average of a surface layer porosity and a partition wall base material porosity intersected with a straight line connecting the above porosity plots (in other words, the distance from the surface corresponding to the porosity of the arithmetic average along the line connecting the plots) was regarded as the thickness of the surface layer.

[Average Pore Diameter of Partition Wall Base material] A partition wall was cut from a honeycomb filter, the surface layer was ground and removed, the average pore diameter of the remaining portion (corresponding to a partition wall base material) was measured, and this value was regarded as the average pore diameter of the partition wall base material.

[Peak Pore Diameter of Surface Layer] A partition wall was cut from a honeycomb filter, and the pore distribution of the partition wall was measured. Afterward, the surface layer was ground and removed from the partition wall, and the pore distribution of the remaining portion (corresponding to a partition wall base material) was measured. A difference between the pore distribution of the partition wall and the pore distribution of the portion where the surface layer had been removed from the partition wall was regarded as the pore distribution of the surface layer, and the pore diameter forming a peak in the pore distribution was regarded as the peak pore diameter of the surface layer. It is to be noted that when the above difference was calculated, the value was converted into a pore volume per sample volume to calculate the difference.

[Mass of Surface Layer] After cutting a partition wall and measuring a mass and an area, the surface layer was ground and removed to measure the mass again, and a difference between the masses was divided by the area to obtain a value as the mass per surface area (filtration area).

[Initial Trapping Efficiency] An exhaust gas from a light oil burner was fed into a honeycomb filter on conditions including an PM concentration of 1 mg/m$^3$, a temperature of 200° C. and a flow rate of 2.4 Nm$^3$/min, and the number of PM particles was measured on an upstream side (before the gas flowed into the honeycomb filter) and a downstream side (after the gas was discharged from the honeycomb filter) in an initial state before the PM was deposited on the honeycomb filter. Then, a trapping efficiency was calculated by a formula of ((the number of the upstream PM particles)−(the number of the downstream PM particles))/(the number of the upstream PM particles)×100. The number of the PM particles was measured by counting the PM particles by use of a scanning mobility particle sizer (SMPS) manufactured by TSI Corporation. When the initial trapping efficiency was 80% or more, the evaluation was given with a circle. When the efficiency was less than 80%, the evaluation was given with a cross.

[Initial Pressure Loss] Air at ordinary temperature was fed at a flow rate of 8 Nm$^3$/min into a honeycomb filter on which any PM was not deposited, and a difference between an upstream pressure and a downstream pressure in the honeycomb filter was measured with a differential pressure gauge to obtain an initial pressure loss (not described in Table 1).

Figure 6:
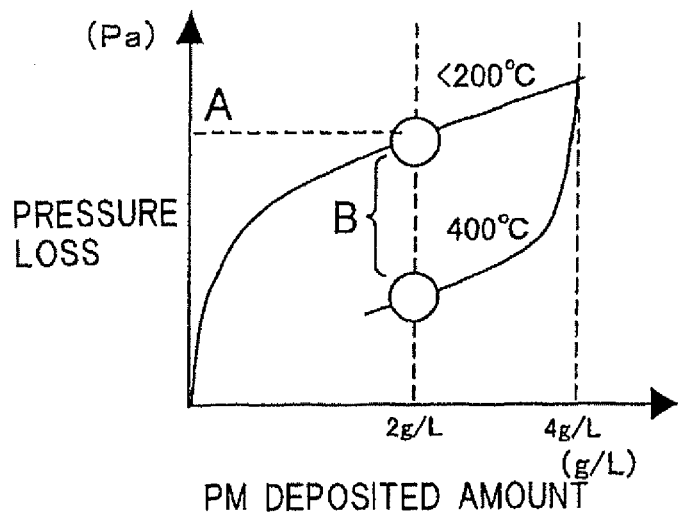
FIG. 6 is a diagram showing the hysteresis characteristics of the honeycomb filter of the present invention and is a graph showing a relation between pressure loss and the amount of deposited PM per volume.

[Pressure Loss during PM Deposition] A PM was deposited as much as 2 g/L as a mass per volume on a honeycomb filter on which any PM was not deposited, air at 200° C. was fed at a flow rate of 2.4 Nm$^3$/min into the honeycomb filter on which the PM was deposited, and a difference between an upstream pressure and a downstream pressure in the honeycomb filter was measured with a differential pressure gauge to obtain pressure loss during the PM deposition (referred to as the pressure loss A, refer to FIG. 6 described later). The pressure loss during the PM deposition shown in Table 1 is a relative value in a case where the result of Comparative Example 1 is 1. When the pressure loss during the PM deposition was less than 0.5, the evaluation was given with a circle. When the pressure loss was 0.5 or more, the evaluation was given with a cross.

[Initial Pressure Loss Increase Ratio] An initial pressure loss increase ratio was calculated by a formula of ((initial pressure loss)−(initial pressure loss of Comparative Example 1))/(initial pressure loss of Comparative Example 1)×100. When the initial pressure loss increase ratio was less than 10%, evaluation was given with a circle. When the ratio was 10% or more, the evaluation was given with a cross.

[Hysteresis Characteristics] FIG. 6 is a graph showing the hysteresis characteristics of a honeycomb filter and shows a relation between pressure loss and the amount of deposited PM per volume. In the present example, the PM was deposited as much as 4 g/L as a mass per volume on the honeycomb filter at a temperature of 200° C. Afterward, a part of the PM was burnt at a temperature of 400° C., and pressure loss (referred to as the pressure loss C) at a time when the PM decreased to 2 g/L was obtained. Then, pressure loss difference B as a difference between the pressure loss A and the pressure loss C was calculated, a ratio of the pressure loss difference B to the pressure loss A was indicated in %, and this ratio was regarded as the hysteresis characteristics.

Examples 2 to 5

Honeycomb filters were prepared in the same manner as in Example 1 except that, to form a surface layer, a fibrous material was appropriately changed, and the atomization of slurry for the surface layer was appropriately adjusted to change a surface layer thickness L1, a surface layer peak pore diameter, a surface layer porosity, a surface layer fiber content, and surface layer thicknesses and masses in positions on an inlet side, in the center and on an outlet side, and the honeycomb filters were measured and evaluated with respect to items similar to those of Example 1. The results are shown in Table 1.

Examples 6, 7

To prepare a plugged honeycomb structure (a formed honeycomb article), a die for extrusion was appropriately changed to change a cell density and a partition wall thickness L2. Moreover, to form a surface layer, a fibrous material was appropriately changed to change the peak pore diameter of the surface layer. Except for these respects, honeycomb filters were prepared in the same manner as in Example 1, and the honeycomb filters were measured and evaluated with respect to items similar to those of Example 1. The results are shown in Table 1.

Examples 8, 9

To prepare a plugged honeycomb structure (a formed honeycomb article), the particle diameter distribution and the blend amount of a cordierite-forming material, and the particle diameter distribution and the blend amount of a pore former were appropriately adjusted to change the average pore diameter of a partition wall base material and the porosity of the partition wall base material. Moreover, to form a surface layer, a fibrous material was appropriately changed to change the peak pore diameter of the surface layer. Except for these respects, honeycomb filters were prepared in the same manner as in Example 1, and the honeycomb filters were measured and evaluated with respect to items similar to those of Example 1. The results are shown in Table 1.

Example 10

To form a surface layer, the atomization of slurry for the surface layer was appropriately adjusted to obtain the uniform thickness and mass of the surface layer in positions on an inlet side, in the center and on an outlet side. Moreover, to form the surface layer, a fibrous material was appropriately changed to change the peak pore diameter of the surface layer. Except for these respects, honeycomb filters were prepared in the same manner as in Example 1, and the honeycomb filters were measured and evaluated with respect to items similar to those of Example 1. The results are shown in Table 1.

Examples 11, 12

To form a surface layer, fibrous material was appropriately changed, and a mass ratio of the fibrous material to a bonding material was appropriately adjusted to change the fiber content of the surface layer and the peak pore diameter of the surface layer. Except for these respects, honeycomb filters were prepared in the same manner as in Example 1, and the honeycomb filters were measured and evaluated with respect to items similar to those of Example 1. The results are shown in Table 1.

Example 13

To form a surface layer, any fibrous material was not used to set a surface layer fiber content to 0, thereby changing the peak pore diameter of the surface layer. Except for these respects, a honeycomb filter was prepared in the same manner as in Example 1, and the honeycomb filter was measured and evaluated with respect to items similar to those of Example 1. The results are shown in Table 1.

Examples 14, 15

To form a surface layer, the changing of a fibrous material, the adjustment of the atomization of slurry for the surface layer and the adjustment of a mass ratio of the fibrous material to a bonding material were appropriately performed to change a surface layer thickness L1, a surface layer peak pore diameter, a surface layer porosity, a surface layer fiber content, and surface layer thicknesses and masses in positions on an inlet side, in the center and on an outlet side. Except for these respects, honeycomb filters were prepared in the same manner as in Example 1, and the honeycomb filters were measured and evaluated with respect to items similar to those of Example 1. The results are shown in Table 1.

Example 16

To form a surface layer, the following method 2 was used, and a surface layer thickness L1, a surface layer peak pore diameter, a surface layer porosity, a surface layer fiber content, and surface layer thicknesses and masses in positions on an inlet side, in the center and on an outlet side were changed. Except for these respects, a honeycomb filter was prepared in the same manner as in Example 1, and the honeycomb filter was measured and evaluated with respect to items similar to those of Example 1. The results are shown in Table 1.

[Forming of Surface Layer (Preparation of Honeycomb Filter)] (Method 2) Aluminosilicate fibers as a fibrous material having an average diameter of 6 μm and an average length of 300 μm, silica as a bonding material having an average particle diameter of 1 μm and cellulose as an organic binder were used in such an amount as to obtain a mass ratio of 90:10:5, and the whole material having a mass of 100 g was mixed with five liters of water to obtain slurry for a surface layer. Then, the slurry was introduced into a needle type atomizer having a nozzle hole diameter of 1.5 mm, atomized with a pneumatic pressure of 0.15 MPa from one end of a beforehand obtained plugged honeycomb structure, air was sucked at 0.5 m³/min from the other end of the structure by a blower, and the slurry was deposited on the inflow side of a partition wall base material of the plugged honeycomb structure. Afterward, the structure was dried at 130° C. for one hour and then fired at 700° C. for one hour to obtain a honeycomb filter in which the plugged honeycomb structure was provided with a surface layer.

Example 17

To form a surface layer, the following method 3 was used as means, and a surface layer thickness L1, a surface layer peak pore diameter, a surface layer porosity, a surface layer fiber content, and surface layer thicknesses and masses in positions on an inlet side, in the center and on an outlet side were changed. Except for these respects, a honeycomb filter was prepared in the same manner as in Example 1, and the honeycomb filter was measured and evaluated with respect to items similar to those of Example 1. The results are shown in Table 1.

[Forming of Surface Layer (Preparation of Honeycomb Filter)] (Method 3) Aluminosilicate fibers as a fibrous material having an average diameter of 6 μm and an average length of 300 μm, silica as a bonding material having an average particle diameter of 1 μm and cellulose as an organic binder were used in such an amount as to obtain a mass ratio of 90:10:5, and the whole material having a mass of 100 g was mixed with five liters of water. Furthermore, 100 g of n-tridecane, and sodium alkylsulfate as a surfactant were mixed with the mixture to obtain an emulsion for a surface layer. Then, the emulsion was introduced into a needle type atomizer having a nozzle hole diameter of 1.5 mm, atomized with a pneumatic pressure of 0.15 MPa from one end of a beforehand obtained plugged honeycomb structure, air was sucked at 0.5 m³/min from the other end of the structure by a blower, and the emulsion was deposited on the inflow side of a partition wall base material of the plugged honeycomb structure. Afterward, the structure was dried at 130° C. for one hour and then fired at 700° C. for one hour to obtain a honeycomb filter in which the plugged honeycomb structure was provided with a surface layer.

Example 18

To form a surface layer, any fibrous material was not used, and the atomization of slurry for the surface layer was appropriately adjusted to set a surface layer fiber content to 0, thereby changing a surface layer thickness L1, a surface layer peak pore diameter, a surface layer porosity and surface layer thicknesses and masses in positions on an inlet side, in the center and on an outlet side. Except for these respects, a honeycomb filter was prepared in the same manner as in Example 1, and the honeycomb filter was measured and evaluated with respect to items similar to those of Example 1. The results are shown in Table 1.

Example 19

To prepare a plugged honeycomb structure (a formed honeycomb article), the particle diameter distribution and the blend amount of a cordierite-forming material were appropriately adjusted to change the average pore diameter of a partition wall base material. Moreover, to form a surface layer, a fibrous material was appropriately changed, and the atomization of slurry for the surface layer was appropriately adjusted to change a surface layer thickness L1, a surface layer peak pore diameter, a surface layer porosity, a surface layer fiber content and surface layer thicknesses and masses in positions on an inlet side, in the center and on an outlet side. Except for these respects, a honeycomb filter was prepared in the same manner as in Example 1, and the honeycomb filter was measured and evaluated with respect to items similar to those of Example 1. The results are shown in Table 1.

Comparative Example 1

A honeycomb filter (a plugged honeycomb structure itself) was prepared in the same manner as in Example 1 except that any surface layer was not formed, and the honeycomb filter was measured and evaluated with respect to items similar to those of Example 1. The results are shown in Table 1.

Comparative Examples 2, 3

To form a surface layer, the atomization of slurry for the surface layer was appropriately adjusted to change a surface layer thickness L1 and a surface layer peak pore diameter and to obtain uniform surface layer thickness and mass in positions on an inlet side, in the center and on an outlet side. Except for these respects, honeycomb filters were prepared in the same manner as in Example 1, and the honeycomb filters were measured and evaluated with respect to items similar to those of Example 1. Results are shown in Table 1.

Comparative Examples 4, 5

Honeycomb filters were prepared in the same manner as in Example 1 except that, to form a surface layer, the ratio of silica as a bonding material, the amount of an organic binder, and the pattern of the change of an air volume flow rate with elapse of time at a time when slurry was deposited on the inflow side of a partition wall base material were appropriately changed to change a surface layer peak pore diameter, a surface layer porosity and surface layer masses in positions on an inlet side, in the center and on an outlet side. The honeycomb filters were measured and evaluated with respect to items similar to those of Example 1. Results are shown in Table 1.

Comparative Example 6

To form a surface layer, the ratio of silica as a bonding material, and the amount of an organic binder as a pore former were appropriately changed to change the peak pore diameter of the surface layer. Except for these respects, a honeycomb filter was prepared in the same manner as in Example 1, and the honeycomb filter was measured and evaluated with respect to items similar to those of Example 1. Results are shown in Table 1. Moreover, to prepare a plugged honeycomb structure (a formed honeycomb article), the particle diameter distribution and blend amount of a cordierite-forming material were appropriately adjusted to change the average pore diameter of a partition wall base material.

Comparative Example 7

To from a surface layer, the amount of an organic binder as a pore former was appropriately changed to change the porosity of the surface layer. Except for these respects, a honeycomb filter was prepared in the same manner as in Example 1, and the honeycomb filter was measured and evaluated with respect to items similar to those of Example 1. Results are shown in Table 1. Moreover, to prepare a plugged honeycomb structure (a formed honeycomb article), the particle diameter distribution and blend amount of a cordierite-forming material were appropriately adjusted to change the porosity of a partition wall base material.

Comparative Examples 8, 9

To from a plugged honeycomb structure (a formed honeycomb article), the particle diameter distribution and blend amount of a cordierite-forming material and the particle diameter distribution and blend amount of a pore former were appropriately adjusted to change the average pore diameter of a partition wall base material and the porosity of the partition wall base material. Moreover, to form a surface layer, the ratio of silica as a bonding material and the amount of an organic binder as a pore former were appropriately changed to change the peak pore diameter of the surface layer. Except for these respects, honeycomb filters were prepared in the same manner as in Example 1, and the honeycomb filters were measured and evaluated with respect to items similar to those of Example 1. Results are shown in Table 1.

Comparative Examples 10, 11

To form a surface layer, a fibrous material was appropriately changed, and the atomization of slurry for the surface layer was appropriately adjusted to change a surface layer thickness L1, a surface layer peak pore diameter, a surface layer porosity, a surface layer fiber content, and surface layer thicknesses and masses in positions on an inlet side, in the center and on an outlet side. Except for these respects, honeycomb filters were prepared in the same manner as in Example 1, and the honeycomb filters were measured and evaluated with respect to items similar to those of Example 1. The results are shown in Table 1.

Comparative Examples 12, 13

To form a surface layer, the atomization of slurry for the surface layer was appropriately adjusted, and the ratio of silica as a bonding material and the amount of an organic binder as a pore former were appropriately changed to change a surface layer thickness L1, a surface layer peak pore diameter, a surface layer porosity and to obtain uniform surface layer thicknesses and masses in positions on an inlet side, in the center and on an outlet side. Except for these respects, honeycomb filters were prepared in the same manner as in Example 1, and the honeycomb filters were measured and evaluated with respect to items similar to those of Example 1. The results are shown in Table 1.

Example 20

[Preparation of Formed Honeycomb Article] As cordierite-forming materials, alumina having an average particle diameter of 2.5 μm, kaoline having an average particle diameter of 2.6 μm, talc having an average particle diameter of 3 μm and silica having an average particle diameter of 3.6 μm were used, and 13 parts by mass of a pore former, 35 parts by mass of a dispersion medium, 6 parts by mass of an organic binder and 0.5 part by mass of a dispersant were added to 100 parts by mass of cordierite-forming material, and they were mixed and kneaded to prepare kneaded clay. Water was used as the dispersion medium, coke having an average particle diameter of 10 μm was used as the pore former, hydroxypropyl methyl cellulose was used as the organic binder, and ethylene glycol was used as the dispersant. Subsequently, the kneaded clay was extruded using a predetermined die to obtain a formed honeycomb article having a quadrangular cell shape and the whole columnar (cylindrical) shape.

[Deposition of Slurry for Surface Layer (Preparation of Honeycomb Filter)] The same cordierite-forming material as that of the formed honeycomb article was used, coke having an average particle diameter of 3 μm was used as the pore former, and water was mixed so as to obtain 73 mass % as a ratio of the pore former in a material solid content, to obtain slurry for a surface layer. Then, the slurry was introduced into a needle type atomizer having a nozzle hole diameter of 1.5 mm, atomized with a pneumatic pressure of 0.15 MPa, and deposited on the inflow side (one surface of a substantial portion (a wall)) of the beforehand obtained formed honeycomb article. Furthermore, the formed honeycomb article was dried by a microwave drier, and further completely dried by a hot air drier. Then, both the end faces of the formed honeycomb article were cut and adjusted to predetermined dimensions. Next, cell openings in one end face of the formed honeycomb article were alternately masked in a checkered pattern (a zigzag pattern), and the masked end was immersed in plugging slurry containing the cordierite-forming material to form plugging portions alternately arranged in the checkered pattern. As to the other end, each cell having one end plugged was masked, and plugging portions were formed by a method similar to that for forming the plugging portions in the one end. Afterward, the formed honeycomb article provided with the plugging portions was dried with the hot air drier and further fired at 1410 to 1440° C. for five hours, to obtain a honeycomb filter having the plugging portions and provided with a surface layer.

[Evaluation of Honeycomb Filter] The resultant honeycomb filter had a columnar shape (a cylindrical shape) with a diameter of 144 mm and a length of 152 mm. As to this honeycomb filter, by the above-mentioned methods, a surface layer thickness L1, a partition wall thickness L2, a surface layer peak pore diameter, a surface layer porosity, a partition wall base material average pore diameter, a partition wall base material porosity, and surface layer thicknesses and masses in positions on an inlet side, in the center and on an outlet side were measured. Moreover, the honeycomb filter was evaluated for an initial trapping efficiency, pressure loss during PM deposition, an initial pressure loss increase ratio and hysteresis characteristics. The results are shown in Table 2 together with a cell density, a surface layer material, a ratio of the surface layer thickness L1 to the partition wall thickness L2, a ratio of a pore former included in slurry for the surface layer in a material solid content, the average particle diameter of a pore former included in the slurry for the surface layer and general evaluation. It is to be noted that in the general evaluation, circles are indicated for examples in which positive evaluations (described above) were obtained for the initial trapping efficiency, the pressure loss during the PM deposition, the initial pressure loss increase ratio and the hysteresis characteristics, and the other examples were crossed. The average pore diameter, the pore distribution and the porosity were measured using trade name: Porosimeter Model 9810 manufactured by Shimadzu Corporation. The inlet side as the measurement target of the surface layer thickness and mass means a position of 20 mm from the end face of the honeycomb filter on the inflow side of an exhaust gas, the outlet side means a position of 20 mm from the end face of the honeycomb filter on the outflow side of the exhaust gas, and the center means a central position (the center in an axial direction) between both the end faces of the columnar honeycomb filter. The surface layer thickness L1 is an average value of surface layer thicknesses measured in ten positions in total including the positions on the inlet side, in the center and on the outlet side.

TABLE 2

| | Cell density (cells/cm²) | Partition wall thickness L2 (um) | Surface layer thickness L1 (um) | Surface layer material | L1/L2 (%) | Surface layer peak pore diameter (um) | Surface layer porosity (%) | Pore former included in slurry for surface layer Ratio in material solid content (mass %) | Pore former included in slurry for surface layer Average particle diameter (μm) |
|---|---|---|---|---|---|---|---|---|---|
| Example 20 | 46.5 | 300 | 30 | Cor | 10 | 3 | 90 | 73 | 2 |
| Example 21 | 46.5 | 300 | 9 | Cor | 3 | 1.2 | 90 | 73 | 1 |
| Example 22 | 46.5 | 300 | 35 | Cor | 12 | 4 | 82 | 71 | 3 |
| Example 23 | 46.5 | 300 | 1.5 | Cor | 1 | 0.3 | 89 | 73 | 0.1 |
| Example 24 | 46.5 | 300 | 82 | Cor | 27 | 13 | 77 | 70 | 10 |
| Example 25 | 15 | 600 | 29 | Cor | 5 | 6 | 75 | 69 | 4 |
| Example 26 | 12 | 750 | 30 | Cor | 4 | 8 | 75 | 69 | 5 |
| Example 27 | 65 | 200 | 28 | Cor | 14 | 6 | 75 | 69 | 4 |
| Example 28 | 65 | 200 | 30 | Cor | 15 | 8 | 75 | 69 | 5 |
| Example 29 | 46.5 | 300 | 29 | Cor | 10 | 6 | 75 | 69 | 4 |
| Example 30 | 46.5 | 300 | 29 | Cor | 10 | 6 | 75 | 69 | 4 |
| Example 31 | 46.5 | 300 | 29 | Cor | 10 | 6 | 75 | 69 | 4 |
| Example 32 | 46.5 | 300 | 30 | Cor | 10 | 8 | 86 | 72 | 5 |
| Example 33 | 46.5 | 300 | 29 | Cor | 10 | 6 | 75 | 69 | 4 |
| Example 34 | 46.5 | 300 | 41 | Cor | 14 | 6 | 80 | 71 | 4 |
| Example 35 | 46.5 | 300 | 38 | Cor | 13 | 6 | 80 | 71 | 4 |
| Example 36 | 46.5 | 300 | 59 | Cor | 20 | 13 | 76 | 70 | 10 |
| Example 37 | 46.5 | 300 | 67 | Cor | 22 | 13 | 76 | 70 | 10 |
| Example 38 | 46.5 | 300 | 64 | Cor | 21 | 13 | 76 | 70 | 10 |
| Example 39 | 46.5 | 300 | 83 | Cor | 28 | 13 | 76 | 70 | 10 |
| Example 40 | 48.5 | 300 | 83 | Cor | 28 | 13 | 77 | 70 | 10 |
| Example 41 | 46.5 | 300 | 29 | Cor | 10 | 6 | 75 | 69 | 4 |
| Example 42 | 46.5 | 300 | 29 | Cor | 10 | 6 | 75 | 69 | 4 |
| Example 43 | 46.5 | 300 | 30 | Cor | 10 | 5 | 75 | 70 | 4 |
| Example 44 | 46.5 | 300 | 30 | Alu, Cer | 10 | 3 | 82 | 71 | 2 |
| Comparative Example 14 | 46.5 | 300 | 0 | Cor | 0 | — | — | — | — |
| Comparative Example 15 | 46.5 | 300 | 0.9 | Cor | 0.3 | 0.12 | 75 | 69 | 0.1 |
| Comparative Example 16 | 46.5 | 300 | 120 | Cor | 40 | 18 | 75 | 69 | 15 |
| Comparative Example 17 | 46.5 | 300 | 30 | Cor | 10 | 8 | 55 | 62 | 5 |
| Comparative Example 18 | 46.5 | 300 | 30 | Cor | 10 | 8 | 75 | 69 | 5 |
| Comparative Example 19 | 46.5 | 300 | 30 | Cor | 10 | 8 | 75 | 69 | 6 |
| Comparative Example 20 | 46.5 | 300 | 0.7 | Cor | 0.2 | 0.12 | 76 | 70 | 0.1 |
| Comparative Example 21 | 46.5 | 300 | 150 | Cor | 50 | 18 | 77 | 70 | 15 |

| Partition wall base material | Partition wall | Surface layer thickness (um) Position of | Surface layer mass (mg/cm²) Position of | Position of |
|---|---|---|---|---|

TABLE 2-continued

|  | average pore diameter (mm) | base material porosity (%) | 20 mm from inlet-side end | Center | Position of 20 mm from outlet-side | 20 mm from inlet-side end | Center | 20 mm from outlet-side end |
|---|---|---|---|---|---|---|---|---|
| Example 20 | 25 | 52 | 35 | 28 | 38 | 0.75 | 0.6 | 0.814 |
| Example 21 | 25 | 52 | 11 | 6 | 11 | 0.225 | 0.123 | 0.225 |
| Example 22 | 25 | 52 | 50 | 30 | 52 | 1.575 | 0.945 | 1.638 |
| Example 23 | 25 | 52 | 2.5 | 1.5 | 2.5 | 0.041 | 0.025 | 0.041 |
| Example 24 | 25 | 52 | 95 | 75 | 100 | 4.715 | 3.722 | 4.963 |
| Example 25 | 25 | 52 | 35 | 28 | 38 | 1.813 | 1.45 | 1.968 |
| Example 26 | 25 | 52 | 35 | 28 | 38 | 1.875 | 1.5 | 2.036 |
| Example 27 | 25 | 52 | 35 | 28 | 38 | 1.75 | 1.4 | 1.9 |
| Example 28 | 25 | 52 | 35 | 28 | 38 | 1.875 | 1.5 | 2.036 |
| Example 29 | 11 | 42 | 35 | 28 | 38 | 1.813 | 1.45 | 1.968 |
| Example 30 | 55 | 63 | 35 | 28 | 38 | 1.813 | 1.45 | 1.968 |
| Example 31 | 25 | 52 | 30 | 30 | 30 | 1.813 | 1.813 | 1.813 |
| Example 32 | 25 | 52 | 35 | 28 | 38 | 1.05 | 0.84 | 1.14 |
| Example 33 | 25 | 52 | 35 | 28 | 38 | 1.813 | 1.45 | 1.968 |
| Example 34 | 25 | 52 | 50 | 30 | 52 | 2.05 | 1.23 | 2.132 |
| Example 35 | 25 | 52 | 50 | 30 | 52 | 1.9 | 1.14 | 1.976 |
| Example 36 | 25 | 52 | 70 | 50 | 80 | 3.54 | 2.529 | 4.046 |
| Example 37 | 25 | 52 | 95 | 48 | 100 | 4.02 | 2.031 | 4.232 |
| Example 38 | 25 | 52 | 95 | 45 | 100 | 5.5 | 4. | 6.2 |
| Example 39 | 25 | 52 | 90 | 70 | 100 | 5.5 | 4. | 6.2 |
| Example 40 | 45 | 52 | 90 | 70 | 100 | 4.773 | 3.712 | 5.303 |
| Example 41 | 11 | 42 | 35 | 28 | 38 | 1.813 | 1.45 | 1.968 |
| Example 42 | 55 | 63 | 35 | 28 | 38 | 1.813 | 1.45 | 1.968 |
| Example 43 | 23 | 52 | 50 | 45 | 48 | 1.875 | 1.688 | 1.8 |
| Example 44 | 25 | 52 | 35 | 28 | 38 | 1.35 | 1.08 | 1.466 |
| Comparative Example 14 | 25 | 52 | — | — | — | — | — | — |
| Comparative Example 15 | 25 | 52 | 0.9 | 0.9 | 0.9 | 0.056 | 0.056 | 0.056 |
| Comparative Example 16 | 25 | 52 | 120 | 120 | 120 | 7.5 | 7.5 | 7.5 |
| Comparative Example 17 | 25 | 52 | 35 | 28 | 38 | 3.375 | 2.7 | 3.664 |
| Comparative Example 18 | 8 | 38 | 35 | 28 | 38 | 1.875 | 1.5 | 2.036 |
| Comparative Example 19 | 65 | 70 | 35 | 28 | 38 | 1.875 | 1.5 | 2.036 |
| Comparative Example 20 | 25 | 52 | 0.9 | 0.9 | 0.9 | 0.042 | 0.042 | 0.042 |
| Comparative Example 21 | 25 | 52 | 120 | 120 | 120 | 8.625 | 8.625 | 8.625 |

|  | Initial trap efficiency | | Pressure loss during PM deposition | | Initial pressure loss increase ratio | | Hysteresis characteristics | | General evaluation |
|---|---|---|---|---|---|---|---|---|---|
|  | Evaluation | (%) | Evaluation | — | Evaluation | (%) | Evaluation | (%) |  |
| Example 20 | ○ | 99 | ○ | 0.2 | ○ | 3 | ○ | 3 | ○ |
| Example 21 | ○ | 99 | ○ | 0.2 | ○ | 4 | ○ | 1 | ○ |
| Example 22 | ○ | 99 | ○ | 0.2 | ○ | 1.5 | ○ | 1 | ○ |
| Example 23 | ○ | 95 | ○ | 0.3 | ○ | 6 | ○ | 3 | ○ |
| Example 24 | ○ | 90 | ○ | 0.4 | ○ | 0.2 | ○ | 3 | ○ |
| Example 25 | ○ | 99 | ○ | 0.2 | ○ | 1.5 | ○ | 3 | ○ |
| Example 26 | ○ | 85 | ○ | 0.45 | ○ | 1.5 | ○ | 3 | ○ |
| Example 27 | ○ | 99 | ○ | 0.2 | ○ | 1.5 | ○ | 3 | ○ |
| Example 28 | ○ | 80 | ○ | 0.45 | ○ | 1.5 | ○ | 3 | ○ |
| Example 29 | ○ | 99 | ○ | 0.2 | ○ | 1.5 | ○ | 3 | ○ |
| Example 30 | ○ | 99 | ○ | 0.2 | ○ | 1.5 | ○ | 3 | ○ |
| Example 31 | ○ | 95 | ○ | 0.3 | ○ | 1.5 | ○ | 3 | ○ |
| Example 32 | ○ | 85 | ○ | 0.2 | ○ | 1.5 | ○ | 3 | ○ |
| Example 33 | ○ | 95 | ○ | 0.3 | ○ | 1.5 | ○ | 5 | ○ |
| Example 34 | ○ | 80 | ○ | 0.45 | ○ | 1.5 | ○ | 22 | ○ |
| Example 35 | ○ | 99 | ○ | 0.46 | ○ | 1.5 | ○ | 23 | ○ |
| Example 36 | ○ | 94 | ○ | 0.3 | ○ | 1.5 | ○ | 3 | ○ |
| Example 37 | ○ | 95 | ○ | 0.4 | ○ | 1.5 | ○ | 5 | ○ |
| Example 38 | ○ | 90 | ○ | 0.4 | ○ | 1.5 | ○ | 5 | ○ |
| Example 39 | ○ | 85 | ○ | 0.45 | ○ | 6 | ○ | 5 | ○ |
| Example 40 | ○ | 85 | ○ | 0.2 | ○ | 0.2 | ○ | 4 | ○ |
| Example 41 | ○ | 99 | ○ | 0.2 | ○ | 1.5 | ○ | 3 | ○ |
| Example 42 | ○ | 99 | ○ | 0.2 | ○ | 1.5 | ○ | 3 | ○ |
| Example 43 | ○ | 99 | ○ | 0.2 | ○ | 1.4 | ○ | 2 | ○ |
| Example 44 | ○ | 99 | ○ | 0.2 | ○ | 3 | ○ | 3 | ○ |
| Comparative Example 14 | x | 30 | x | 1 | ○ | 0 | x | 70 | x |
| Comparative Example 15 | ○ | 99 | x | 0.9 | x | 11 | ○ | 1 | x |

TABLE 2-continued

| | | | | | | | | | |
|---|---|---|---|---|---|---|---|---|---|
| Comparative Example 16 | x | 60 | ○ | 0.2 | ○ | 1 | ○ | 1 | x |
| Comparative Example 17 | ○ | 99 | x | 2.5 | ○ | 1.5 | ○ | 3 | x |
| Comparative Example 18 | ○ | 80 | x | 1.8 | ○ | 1.5 | ○ | 3 | x |
| Comparative Example 19 | x | 55 | x | 0.5 | ○ | 1.5 | ○ | 3 | x |
| Comparative Example 20 | x | 65 | x | 0.9 | x | 11 | ○ | 1 | x |
| Comparative Example 21 | x | 60 | x | 1.1 | x | 15 | ○ | 1 | x |

Note)
In the surface layer material, Cor is the abbreviation of cordierite, Alu is the abbreviation of alumina, and Cer is the abbreviation of ceria.

Examples 21 to 24

To deposit slurry for a surface layer, the average particle diameter of talc of a cordierite-forming material (for the surface layer) was changed to 2 μm (Example 21), 5 μm (Example 22), 1 μm (Example 23) and 5 μm (Example 24). Moreover, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity and surface layer thicknesses and masses in positions on an inlet side, in the center and on an outlet side were changed. Except for these respects, honeycomb filters were prepared in the same manner as in Example 20, and the honeycomb filters were measured and evaluated with respect to items similar to those of Example 20. The results are shown in Table 2.

Examples 25 to 28

To prepare a formed honeycomb article, a die for extrusion was appropriately changed to change a cell density and a partition wall thickness L2.

Moreover, to deposit slurry for a surface layer, the average particle diameter of talc of a cordierite-forming material (for the surface layer) was changed to 5 μm. Moreover, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity and surface layer masses in positions on an inlet side, in the center and on an outlet side were changed. Except for these respects, honeycomb filters were prepared in the same manner as in Example 20, and the honeycomb filters were measured and evaluated with respect to items similar to those of Example 20. The results are shown in Table 2.

Examples 29, 30

To prepare a formed honeycomb article, the particle diameter distribution and blend amount of a cordierite-forming material and the particle diameter distribution and blend amount of a pore former were appropriately adjusted to change the average pore diameter of a partition wall base material and the porosity of the partition wall base material. Moreover, to deposit slurry for a surface layer, the average particle diameter of talc of the cordierite-forming material (for the surface layer) was changed to 5 μm, the average particle diameter of the pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity and surface layer masses in positions on an inlet side, in the center and on an outlet side were changed. Except for these respects, honeycomb filters were prepared in the same manner as in Example 20, and the honeycomb filters were measured and evaluated with respect to items similar to those of Example 20. The results are shown in Table 2.

Example 31

To deposit slurry for a surface layer, the average particle diameter of talc of a cordierite-forming material (for the surface layer) was changed to 5 μm, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter and a surface layer porosity were changed, and surface layer thicknesses and masses in positions on an inlet side, in the center and on an outlet side were uniformed. Except for these respects, a honeycomb filter was prepared in the same manner as in Example 20, and the honeycomb filter was measured and evaluated with respect to items similar to those of Example 20. The results are shown in Table 2.

Example 32

To deposit slurry for a surface layer, the average particle diameter of talc of a cordierite-forming material (for the surface layer) was changed to 5 μm. Moreover, the average particle diameter of a pore former (coke) and the ratio of the pore former in a material solid content were appropriately changed, and the atomization of the slurry for the surface layer was appropriately adjusted. In consequence, a surface layer peak pore diameter, a surface layer porosity, and surface layer masses in positions on an inlet side, in the center and on an outlet side were changed. Except for these respects, a honeycomb filter was prepared in the same manner as in Example 20, and the honeycomb filter was measured and evaluated with respect to items similar to those of Example 20. The results are shown in Table 1.

Example 33

To deposit slurry for a surface layer, the average particle diameter of talc of a cordierite-forming material (for the surface layer) was changed to 5 µm, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity, and surface layer masses in positions on an inlet side, in the center and on an outlet side were changed. Except for these respects, a honeycomb filter was prepared in the same manner as in Example 20, and the honeycomb filter was measured and evaluated with respect to items similar to those of Example 20. The results are shown in Table 2.

Examples 34, 35

To deposit slurry for a surface layer, the average particle diameter of talc of a cordierite-forming material (for the surface layer) was changed to 5 µm. Moreover, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity, and surface layer thicknesses and masses in positions on an inlet side, in the center and on an outlet side were changed. Except for these respects, honeycomb filters were prepared in the same manner as in Example 20, and the honeycomb filters were measured and evaluated with respect to items similar to those of Example 20. The results are shown in Table 2.

Examples 36 to 39

To deposit slurry for a surface layer, the average particle diameter of talc of a cordierite-forming material (for the surface layer) was changed to 11 µm. Moreover, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity, and surface layer thicknesses and masses in positions on an inlet side, in the center and on an outlet side were changed. Except for these respects, honeycomb filters were prepared in the same manner as in Example 20, and the honeycomb filters were measured and evaluated with respect to items similar to those of Example 20. The results are shown in Table 2.

Example 40

To prepare a formed honeycomb article, the particle diameter distribution and blend amount of a cordierite-forming material were appropriately adjusted to change the average pore diameter of a partition wall base material. Moreover, to deposit slurry for a surface layer, the average particle diameter of talc of a cordierite-forming material (for the surface layer) was changed to 11 µm. Moreover, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity, and surface layer thicknesses and masses in positions on an inlet side, in the center and on an outlet side were changed. Except these respects, a honeycomb filter was prepared in the same manner as in Example 20, and the honeycomb filter was measured and evaluated with respect to items similar to those of Example 20. Results are shown in Table 2.

Examples 41, 42

To prepare a formed honeycomb article, the particle diameter distribution and blend amount of a cordierite-forming material, and the particle diameter distribution and blend amount of a pore former were appropriately adjusted to change the average pore diameter of a partition wall base material and the porosity of the partition wall base material. Moreover, to deposit a slurry for a surface layer, the slurry was deposited on the inflow side and outflow side of the formed honeycomb article (both surfaces of a substantial portion (a wall)). Furthermore, the average particle diameter of talc of the cordierite-forming material (for the surface layer) was changed to 5 µm. Moreover, the average particle diameter of the pore former (coke) and the ratio of the pore former in a material solid content were appropriately changed, and the atomization of the slurry for the surface layer was appropriately adjusted. In consequence, a surface layer thickness L1, a surface layer peak pore diameter, a surface layer porosity, and surface layer masses in positions on an inlet side, in the center and on an outlet side were changed. Except for these respects, honeycomb filters were prepared in the same manner as in Example 20, and the honeycomb filters were measured and evaluated with respect to items similar to those of Example 20. The results are shown in Table 2.

Example 43

To prepare a formed honeycomb article, silicon carbide having an average particle diameter of 5 µm was used as a material, and the average pore diameter and porosity of a partition wall base material were changed. Moreover, to deposit slurry for a surface layer, the same silicon carbide material as that of the formed honeycomb article was used as the slurry for the surface layer, and the slurry was deposited on the inflow side and outflow side of the formed honeycomb article (both surfaces of a substantial portion (a wall)). Moreover, the average particle diameter of a pore former (coke) and the ratio of the pore former in a material solid content were appropriately changed, and the atomization of the slurry for the surface layer was appropriately adjusted. In consequence, a surface layer peak pore diameter, a surface layer porosity, and surface layer thicknesses and masses in positions on an inlet side, in the center and on an outlet side were changed. Except for these respects, a honeycomb filter was prepared in the same manner as in Example 20, and the honeycomb filter was measured and evaluated with respect to items similar to those of Example 20. The results are shown in Table 2.

Comparative Example 14

A honeycomb filter (a plugged honeycomb structure which did not have any surface layer) was prepared in the same manner as in Example 20 except that any slurry for the surface layer was not deposited (any surface layer was not formed), and the honeycomb filter was measured and evaluated with respect to items similar to those of Example 20. The results are shown in Table 2.

Comparative Examples 15, 16, 20 and 21

To deposit slurry for a surface layer, the average particle diameter of talc of a cordierite-forming material (for the surface layer) was changed to 1 μm (Comparative Examples 15, 20), and 11 μm (Comparative Examples 16, 21). Moreover, the average particle diameter of a pore former (coke) and the ratio of the pore former in a material solid content were appropriately changed, and the atomization of the slurry for the surface layer was appropriately adjusted. In consequence, a surface layer thickness L1, a surface layer peak pore diameter, and a surface layer porosity were changed to obtain uniform surface layer thickness and mass in positions on an inlet side, in the center and on an outlet side. Except for these respects, honeycomb filters were prepared in the same manner as in Example 20, and the honeycomb filters were measured and evaluated with respect to items similar to those of Example 20. The results are shown in Table 1.

Comparative Example 17

To deposit slurry for a surface layer, the average particle diameter of talc of a cordierite-forming material (for the surface layer) was changed to 5 μm. Moreover, the average particle diameter of a pore former (coke) and the ratio of the pore former in a material solid content were appropriately changed, and the atomization of the slurry for the surface layer was appropriately adjusted. In consequence, a surface layer peak pore diameter, a surface layer porosity and surface layer masses in positions on an inlet side, in the center and on an outlet side were changed. Except for these respects, a honeycomb filter was prepared in the same manner as in Example 20, and the honeycomb filter was measured and evaluated with respect to items similar to those of Example 20. The results are shown in Table 1.

Comparative Examples 18, 19

To prepare a formed honeycomb article, the particle diameter distribution and blend amount of a cordierite-forming material, and the particle diameter distribution and blend amount of a pore former were appropriately adjusted to change the average pore diameter of a partition wall base material and the porosity of the partition wall base material. Moreover, to deposit slurry for a surface layer, the average particle diameter of talc of the cordierite-forming material (for the surface layer) was changed to 5 μm, the average particle diameter of the pore former (coke) and the ratio of the pore former in a material solid content were appropriately changed, and the atomization of the slurry for the surface layer was appropriately adjusted. In consequence, a surface layer peak pore diameter, a surface layer porosity and surface layer masses in positions on an inlet side, in the center and on an outlet side were changed. Except for these respects, honeycomb filters were prepared in the same manner as in Example 20, and the honeycomb filters were measured and evaluated with respect to items similar to those of Example 20. The results are shown in Table 2.

Example 44

[Preparation of Formed Honeycomb Article] As cordierite-forming materials, alumina, aluminum hydroxide, kaoline, talc and silica were used, and 13 parts by mass of a pore former, 35 parts by mass of a dispersion medium, 6 parts by mass of an organic binder and 0.5 part by mass of a dispersant were added to 100 parts by mass of the cordierite-forming material, and they were mixed and kneaded to prepare kneaded clay. Water was used as the dispersion medium, coke having an average particle diameter of 10 μm was used as the pore former, hydroxypropyl methyl cellulose was used as the organic binder, and ethylene glycol was used as the dispersant. Subsequently, the kneaded clay was extruded using a predetermined die to obtain a formed honeycomb article having a quadrangular cell shape and the whole columnar (cylindrical) shape.

[Preparation of Plugged Honeycomb Filter] The formed honeycomb article was dried by a microwave drier and further completely dried by a hot air drier, and then both the end faces of the formed honeycomb article were cut and adjusted to predetermined dimensions. Then, cell openings in one end face of the formed honeycomb article were alternately masked in a checkered pattern (a zigzag pattern), and the masked end was immersed in a plugging slurry containing the cordierite-forming material to form plugging portions alternately arranged in the checkered pattern. As to the other end, each cell having one end plugged was masked, and plugging portions were formed by a method similar to that for forming the plugging portions in the one end. Afterward, the formed honeycomb article provided with the plugging portions was dried with a hot air drier and further fired at 1410 to 1440° C. for five hours to obtain a plugged honeycomb structure.

[Deposition of Slurry for Surface Layer (Preparation of Honeycomb Filter)] A mixture (a specific surface area of 50 $m^2/g$) of γ alumina ($\gamma Al_2O_3$) and ceria ($CeO_2$) having an initial average particle diameter of 50 μm was wet-crushed using a ball mill to obtain crushed particles having an average particle diameter of 5 μm. Then, the crushed particles were immersed in a platinum (Pt)-containing solution, and Pt was carried in the pores of the crushed particles. Resin particles having an average particle diameter of 3 μm were added as a pore former to the crushed particles carrying Pt in this manner, and further acetic acid and water were added to obtain the slurry for the surface layer. Moreover, this slurry for the surface layer was vacuum-sucked from the outlet-side end face of the beforehand obtained plugged honeycomb structure to deposit the slurry on the inflow side of the partition wall base material. Subsequently, after drying the structure, the structure was fired at 600° C. for three hours to obtain a honeycomb filter in which the plugged honeycomb structure was provided with the surface layer constituted of a catalyst layer (an average thickness of 30 μm). It is to be noted that the amount of an oxide ($\gamma Al_2O_3$ and $CeO_2$) in the surface layer (the catalyst layer) was 0.75 mg per 1 $cm^2$ of partition wall filtration area. Moreover, the amount of Pt as a noble metal was 2 g per kiloliter of the volume of the honeycomb structure. The surface layer (the catalyst layer) had a peak pore diameter of 3 μm and a porosity of 82%.

[Evaluation of Honeycomb Filter] The resultant honeycomb filter had a columnar shape (a cylindrical shape) with a diameter of 144 mm and a length of 152 mm. As to this honeycomb filter, by the above-mentioned methods, a surface layer thickness L1, a partition wall thickness L2, a surface layer peak pore diameter, a surface layer porosity, a partition wall base material average pore diameter, a partition wall base material porosity, and surface layer thicknesses and masses in positions on an inlet side, in the center and on an outlet side were measured. Moreover, the honeycomb filter was evaluated for an initial trapping efficiency, pressure loss during PM deposition, an initial pressure loss increase ratio and hysteresis characteristics. The results are shown in Table 2 together with a cell density, a surface layer material, a ratio of the surface layer thickness L1 to the partition wall thickness L2, a ratio of a pore former included in slurry for the surface layer in a material solid content, the average particle diameter of the pore former included in the slurry for the surface layer and general evaluation. It is to be noted that in the general evaluation, circles are indicated for examples in which positive evaluations (described above) were obtained for the initial trapping efficiency, the pressure loss during the PM deposition, the initial pressure loss increase ratio and the hysteresis characteristics, and the other examples were crossed. The average pore diameter, the pore distribution and the porosity were measured using trade name: Porosimeter Model 9810 manufactured by Shimadzu Corporation. The inlet side as the measurement target of the surface layer thickness and mass means a position of 20 mm from the end face of the honeycomb filter on the inflow side of an exhaust gas, the outlet side means a position of 20 mm from the end face of the honeycomb filter on the outflow side of the exhaust gas, and the center means a central position (the center in an axial direction) between both end faces of the columnar honeycomb filter. The surface layer thickness L1 is an average value of surface layer thicknesses measured in ten positions in total including the positions on the inlet side, in the center and on the outlet side.

(Considerations) From the results shown in Tables 1, 2, in the honeycomb filters of Examples 1 to 43, the peak pore diameter of the surface layer is equal to or smaller than the average pore diameter of the partition wall base material, the porosity of the surface layer is larger than that of the partition wall base material, the surface layer has a peak pore diameter of 0.3 µm or more and less than 20 µm, the surface layer has a porosity of 60% or more and less than 95%, the thickness L1 of the surface layer is 0.5% or more and less than 30% of the partition wall thickness L2, the mass of the surface layer per filtration area is 0.01 mg/cm$^2$ or more and less than 6 mg/cm$^2$, the partition wall base material has an average pore diameter of 10 µm or more and less than 60 µm, and the partition wall base material has a porosity of 40% or more and less than 65%. Therefore, the honeycomb filters have high PM initial trapping efficiency, small pressure loss during the PM deposition, small initial pressure loss increase ratio and small hysteresis characteristics. Moreover, similarly in the honeycomb filter of Example 44, the peak pore diameter of the surface layer is equal to or smaller than the average pore diameter of the partition wall base material, the porosity of the surface layer is larger than that of the partition wall base material, the surface layer has a peak pore diameter of 0.3 µm or more and less than 20 µm, the surface layer has a porosity of 60% or more and less than 95%, the thickness L1 of the surface layer is 0.5% or more and less than 30% of the partition wall thickness L2, the mass of the surface layer per filtration area is 0.01 mg/cm$^2$ or more and less than 6 mg/cm$^2$, the partition wall base material has an average pore diameter of 10 µm or more and less than 60 µm, and the partition wall base material has a porosity of 40% or more and less than 65%. Therefore, the honeycomb filter has high PM initial trapping efficiency, small pressure loss during the PM deposition, small initial pressure loss increase ratio and small hysteresis characteristics.

On the other hand, the honeycomb filters of Comparative Examples 1, 14 are not provided with any surface layer, and hence the filters are poor in the PM initial trapping efficiency, the pressure loss during the PM deposition and the hysteresis characteristics. In Comparative Examples 2, 15 and 20, the peak pore diameter of the surface layer and the ratio of the surface layer thickness L1 to the partition wall thickness L2 do not satisfy the requirements of the honeycomb filter of the present invention, and hence the honeycomb filters have both large pressure loss during the PM deposition and large initial pressure loss increase ratio. In Comparative Examples 3, 16 and 21, the thickness L1 of the surface layer is excessively large, the ratio of the surface layer thickness L1 with respect to the partition wall thickness L2 does not satisfy the requirements of the honeycomb filter of the present invention, and the honeycomb filters have poor PM initial trapping efficiency. In Comparative Examples 4, 17, the surface layer has small porosity, the requirements of the honeycomb filter of the present invention are not satisfied, and the pressure loss during the PM deposition is therefore large. Conversely, in Comparative Example 5, the surface layer has large porosity, the requirements of the honeycomb filter of the present invention are not satisfied, and hence the honeycomb filter has poor PM initial trapping efficiency. In Comparative Example 6, the peak pore diameter of the surface layer is larger than the average pore diameter of the partition wall base material, the requirements of the present invention are not satisfied, and hence the honeycomb filter is poor in the PM initial trapping efficiency, the pressure loss during the PM deposition and the hysteresis characteristics. In Comparative Example 7, the surface layer porosity is lower than the partition wall base material porosity, the requirements of the present invention are not satisfied, and hence the honeycomb filter is poor in the pressure loss during the PM deposition. In Comparative Examples 8, 18, the partition wall base material has both small average pore diameter and small porosity, the requirements of the honeycomb filter of the present invention are not satisfied, and hence the honeycomb filters have large pressure loss during the PM deposition. Conversely, in Comparative Examples 9, 19, the partition wall base material has both large average pore diameter and large porosity, the requirements of the honeycomb filter of the present invention are not satisfied, and hence the honeycomb filters have poor PM initial trapping efficiency. In Comparative Example 10, the surface layer fibers have small average diameter and small average length, and hence the honeycomb filter has large pressure loss during the PM deposition and large hysteresis characteristics. In Comparative Example 11, the surface layer fibers have large average diameter and large average length, and the honeycomb filter is poor in the PM initial trapping efficiency, the pressure loss during the PM deposition and the hysteresis characteristics. In Comparative Example 12, the surface layer has small peak pore diameter and also has too small thickness L1, and hence the ratio of the surface layer thickness L1 to the partition wall thickness L2 does not satisfy the requirements of the honeycomb filter of the present invention. As an evaluation result, the comparative example is poor in the PM initial trapping efficiency, the pressure loss during the PM deposition and the hysteresis characteristics in the same manner as in Comparative Example 11. In Comparative Example 13, the surface layer has excessively large thickness L1, and hence the ratio of the surface layer thickness L1 to the partition wall thickness L2 and the mass of the surface layer per filtration area do not satisfy the requirements of the honeycomb filter of the present invention, and the honeycomb filter has large pressure loss during the PM deposition, high initial pressure loss increase ratio and large hysteresis characteristics though it has high PM initial trapping efficiency.

Industrial Applicability

A honeycomb filter of the present invention can be used for removing, from exhaust gas, particulate matter in the exhaust gas discharged from an internal combustion engine such as an engine for an automobile, an engine for a construction machine or a stational engine for an industrial machine, other combustion devices and the like.

A honeycomb filter manufacturing method of the present invention can be used as means for preparing the honeycomb filter of the present invention.

The invention claimed is:

1. A honeycomb filter comprising: partition walls having a porous partition wall base material which separates and forms a plurality of cells functioning as the flow paths of fluid and a surface layer provided on only an inflow side or both the inflow side and an outflow side of the partition wall base material, wherein predetermined cells each having an end opened on one side and the other end plugged on the other side and the remaining cells each having an end plugged on one side and the other end opened on the other end are alternately arranged, and the following conditions (1) to (5) are satisfied, (1) a peak; pore diameter of the surface layer is equal to or smaller than the average pore diameter of the partition wall base material, and the porosity of the surface layer is larger than that of the partition wall base material, (2) the surface layer has a peal; pore diameter of 3 μm or more and less than 10 μm and a porosity of 75% or more and less than 90% (measurement method is mercury porosimetry), (3) a thickness L1 of the surface layer is 0.5% or more and less than 30% of the thickness L2 of the partition walls, (4) a mass of the surface layer per filtration area is 0.01 mg/cm$^2$ or more and less than 6 mg/cm$^2$ and (5) the partition wall base material has an average pore diameter of 11 μm or more and less than 55 μm and a porosity of 40% or more and less than 65%.

2. The honeycomb filter according to claim 1, wherein in a distribution in a direction in which the one end is connected to the other end, the thickness L1 of the surface layer in the center thereof is smaller than that in the vicinity of the one end or the other end.

3. The honeycomb filter according to claim 1, wherein the thickness L1 of the surface layer is 3% or more and less than 15% of the thickness L2 of the partition walls.

4. The honeycomb filter according to claim 1, wherein the partition wall base material has an average pore diameter of 40 μm or more and less than 55 μm and a porosity of 40% or more and less than 60%.

5. The honeycomb filter according to claim 1, wherein the partition wall base material is constituted of as a main component, at least one material selected from the material group consisting of cordierite, Si coupled SiC, recrystallized SiC, aluminum titanate, mullite, silicon nitride, sialon, zirconium phosphate, zirconia, titania, alumina and silica.

6. The honeycomb filter according to claim 1, wherein the partition wall base material and the surface layer are constituted of the same material as a main component.

7. The honeycomb filter according to claim 1, wherein the surface layer are constituted of, in a content of 70 mass % or more, at least one fiber material selected from the material group consisting of aluminosilicate, alumina, silica, zirconia, ceria and mullite fibers.

8. The honeycomb filter according to claim 7, wherein the fibers is bio-soluble fibers having an average diameter of 0.5 μm or more and less than 8 μm and an average length of 100 μm or more and less than 500 μm.

9. The honeycomb filter according to claim 1,
wherein the surface layer provided on at least the inflow side of the partition wall base material is constituted of a catalyst layer containing at least one material selected from the material group consisting of alumina, zirconia, titania, zeolite and ceria.

10. The honeycomb filter according to claim 9, wherein the hydraulic diameters of the cells in the end face on the inlet side of the fluid are equal to or larger than those of the cells in the end face on the outlet side of the fluid.

* * * * *